US011323980B2

(12) United States Patent
Rico Alvarino et al.

(10) Patent No.: US 11,323,980 B2
(45) Date of Patent: May 3, 2022

(54) SYSTEM AND METHOD FOR SCHEDULING NARROWBAND REFERENCE SIGNALS IN PAGING OCCASIONS

(71) Applicant: QUALCOMM Incorporated, San Diego, CA (US)

(72) Inventors: Alberto Rico Alvarino, San Diego, CA (US); Le Liu, Fremont, CA (US); Arash Mirbagheri, San Diego, CA (US); Umesh Phuyal, San Diego, CA (US); Mungal Singh Dhanda, Slough (GB); Ayan Sengupta, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 20 days.

(21) Appl. No.: 16/780,741

(22) Filed: Feb. 3, 2020

(65) Prior Publication Data
US 2020/0252903 A1 Aug. 6, 2020

Related U.S. Application Data

(60) Provisional application No. 62/801,612, filed on Feb. 5, 2019.

(51) Int. Cl.
*H04W 68/02* (2009.01)
*H04L 5/00* (2006.01)
*H04W 72/12* (2009.01)

(52) U.S. Cl.
CPC ........... *H04W 68/02* (2013.01); *H04L 5/0048* (2013.01); *H04W 72/12* (2013.01)

(58) Field of Classification Search
CPC ....... H04L 5/0048; H04L 5/0007; H04L 5/00; H04W 48/12; H04W 68/02; H04W 72/12; H04W 4/70

(Continued)

(56) References Cited

U.S. PATENT DOCUMENTS 10,085,233 B2 * 9/2018 Deogun ............. H04W 68/005
10,454,606 B2 * 10/2019 Xue .................... H04J 11/0083
(Continued)

OTHER PUBLICATIONS

Ericsson: "Presence of NRS on a Non-Anchor Carriers for Paging in NB-IOT", 3GPP Draft, 3GPP TSG-RAN WG1 Meeting #95, R1-1812132, Presence of NRS on a Non-Anchor Carriers for Paging in NB-IOT, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051553973, 6 pages, Retrieved from the Internet: URL : http://www.3gpp.org/ftp/Meetings%5F3GPP%5FSYNC/RAN1/Docs/R1%2D1812132%2Ezip. [retrieved on Nov. 11, 2018] the whole document.

(Continued)

*Primary Examiner* — Man U Phan
(74) *Attorney, Agent, or Firm* — ArentFox, LLP

(57) ABSTRACT

A base station may calculate a scheduling value based on at least one of a number of groups associated with a set of UEs operating on a cell provided by the base station a radio frame number, or a subframe number. The base station may send, based on the calculated scheduling value, at least one NRS in at least one PO on a narrowband control channel. A UE may receive, from the base station providing the cell, information associated with at least one PO for the UE. The UE may determine, based on the received information, scheduling information associated with at least one NRS in the at least one PO. The UE may detect the at least one NRS in the at least one PO on a narrowband control channel when the determined scheduling information indicates the at least one NRS is in the at least one PO.

46 Claims, 21 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 10,477,367 | B2* | 11/2019 | Blankenship | H04W 68/02 |
| 10,477,537 | B2* | 11/2019 | Rico Alvarino | B65D 85/70 |
| 10,506,472 | B2* | 12/2019 | Rico Alvarino | H04W 28/16 |
| 10,952,183 | B2* | 3/2021 | Hoglund | H04W 68/005 |
| 11,006,405 | B2* | 5/2021 | Rico Alvarino | H04W 72/044 |
| 2017/0230979 | A1* | 8/2017 | Saxena | H04W 72/042 |
| 2020/0053695 | A1* | 2/2020 | Charbit | H04W 84/022 |
| 2020/0169956 | A1* | 5/2020 | Sun | H04L 12/2803 |
| 2020/0245317 | A1* | 7/2020 | Hwang | H04W 72/048 |
| 2020/0351822 | A1* | 11/2020 | Roy | H04W 76/27 |

OTHER PUBLICATIONS

Huawei, et al., "NRS Presence on Non-Anchor Carriers for Paging", 3GPP Draft, 3GPP TSG RAN WG1 Meeting #96, R1-1901507, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051599204, 10 pages, Retrieved from the Internet: URL : http://www.3gpp.org/ftp/tsg%5Fran/WG1%5FRL1/TSGR1%5F96/Docs/R1%2D1901507%2Ezip. [retrieved on Feb. 16, 2019] the whole document.
International Search Report and Written Opinion—PCT/US2020/016639—ISA/EPO—dated Jun. 8, 2020 (191319WO).

MEDIATEK Inc: "NRS Presence on Non-Anchor Carriers in NB-IOT", 3GPP Draft, 3GPP TSG RAN WG1 Meeting #94bis, R1-1810609, MEDIATEK-NRS on Non-Anchor Carriers, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 28, 2018 (Sep. 28, 2018), XP051518015, 4 pages, Retrieved from the Internet: URL: http://www.3gpp.org/ftp/tsg%5Fran/WG1%5FRL1/TSGR1%5F94b/Docs/R1%2D1810609%2Ezip. [retrieved on Sep. 28, 2018] p. 1.
MEDIATEK Inc: "NRS Presence on Non-Anchor Carriers in NB-IOT", 3GPP Draft, SGPP TSG RAN WGI Meeting #96, R1-1901735-MEDIATEK-NRS Presence on Non-Anchor Carriers in NB-IOT, 3rd Generation Partnership Project (3GPP), Mobile Competence Centre, 650, Route Des Lucioles, F-06921 Sophia-Antipolis Cedex, France, vol. RAN WG1, No. Athens, Greece; Feb. 25, 2019-Mar. 1, 2019, Feb. 14, 2019 (Feb. 14, 2019), XP051599430, 5 pages, Retrieved from the Internet: URL : http://www.3gpp.org/ftp/tsg%5Fran/WG1%5FRL1/TSGR1%5F96/Docs/R1%2D1901735%2Ezip. [retrieved on Feb. 14, 2019) the whole document.
Qualcomm Incorporated: "Presence of NRS on a Non-Anchor for Paging (Feature lead summary)", 3GPP Draft, 3GPP TSG-RAN WGI Meeting #95, R1-1813716, Presence of NRS on a Non-Anchor for Paging, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 14, 2018 (Nov. 14, 2018), XP051494309, 7 pages, Retrieved from the Internet: URL : http://www.3gpp.org/ftp/tsg%5Fran/WG1%5FRL1/TSGR1%5F95/Docs/R1%2D1813716%2Ezip. [retrieved on Nov. 14, 2018] the whole document.

* cited by examiner

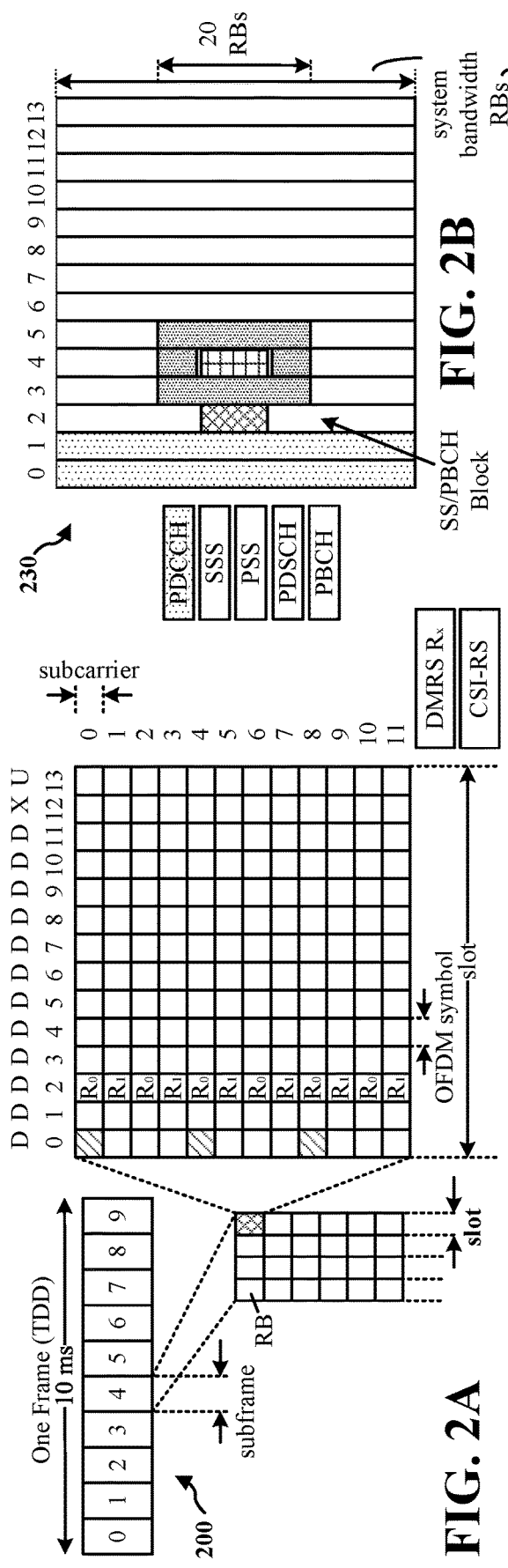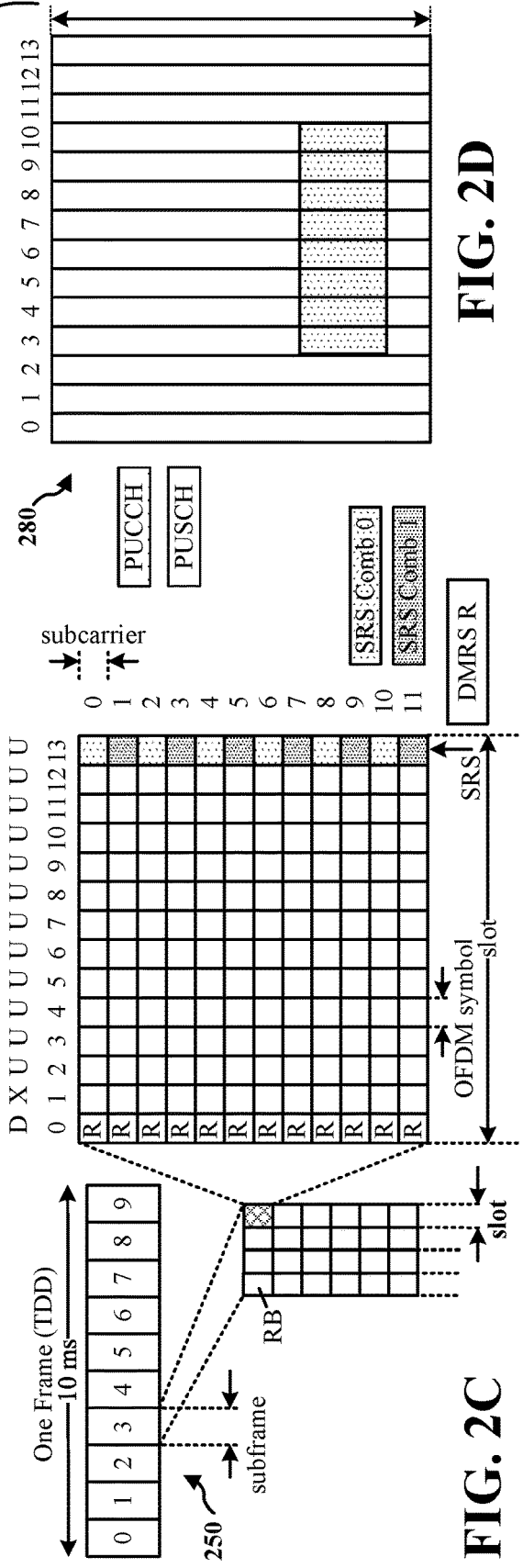
FIG. 2A  FIG. 2B  FIG. 2C  FIG. 2D

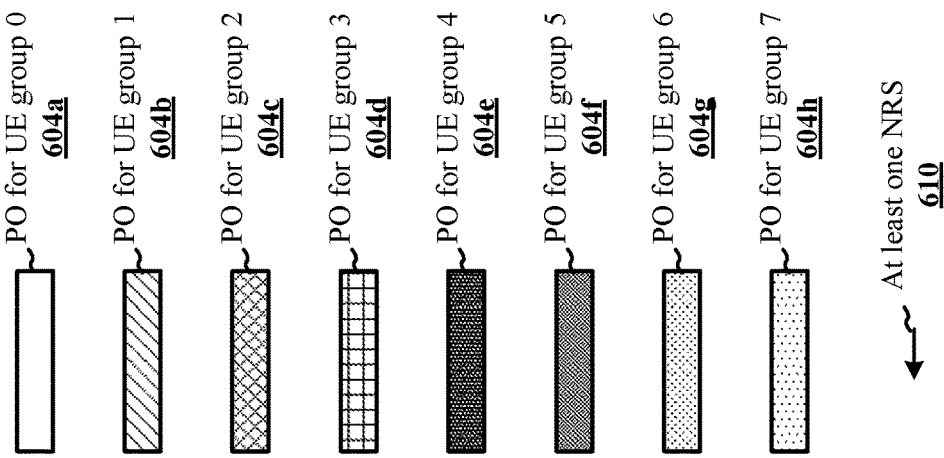
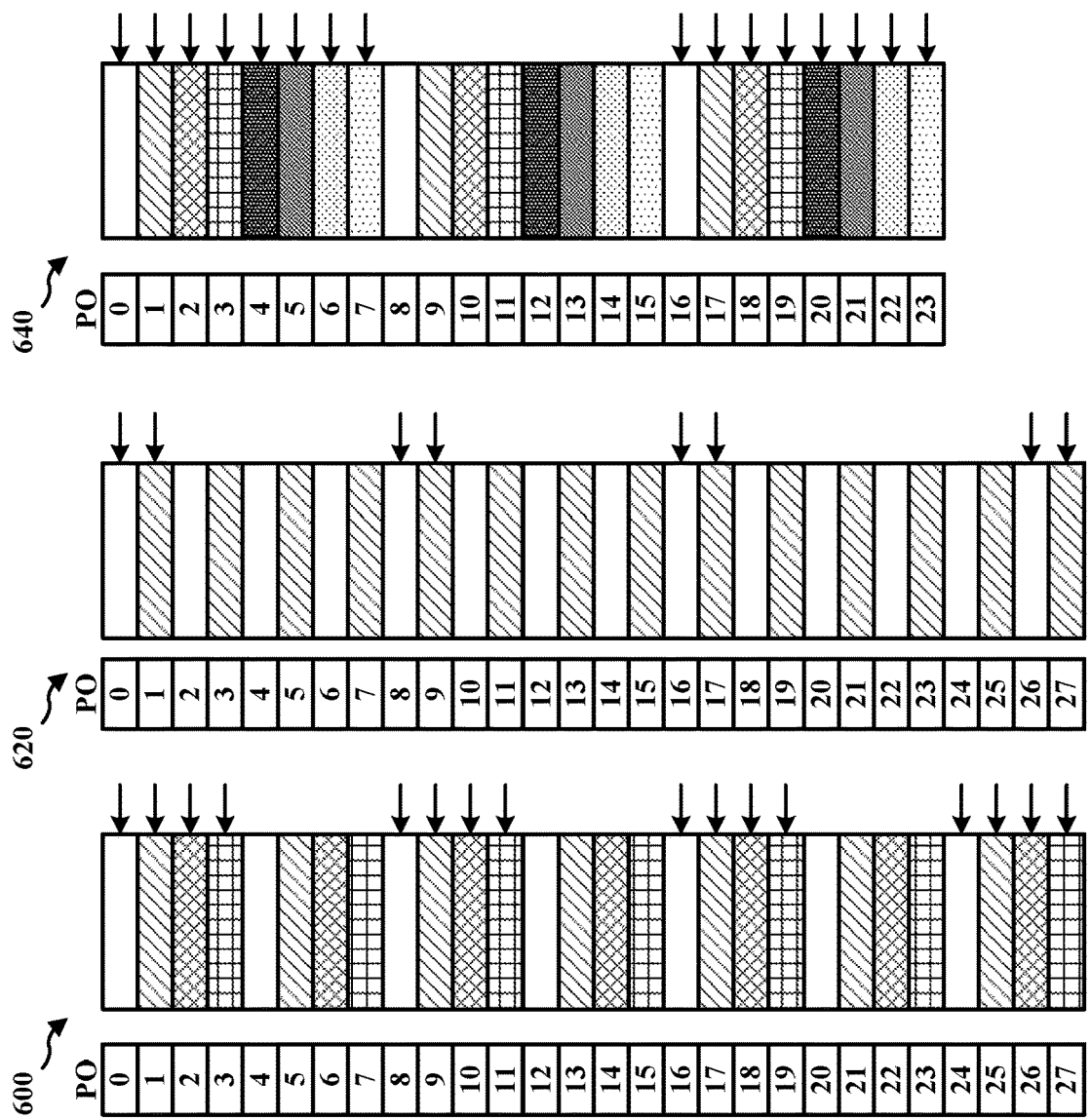
FIG. 6

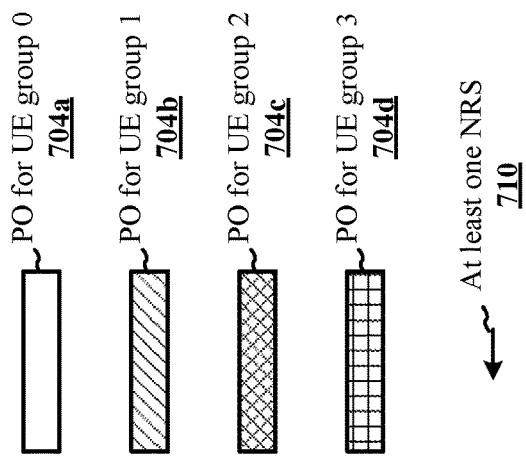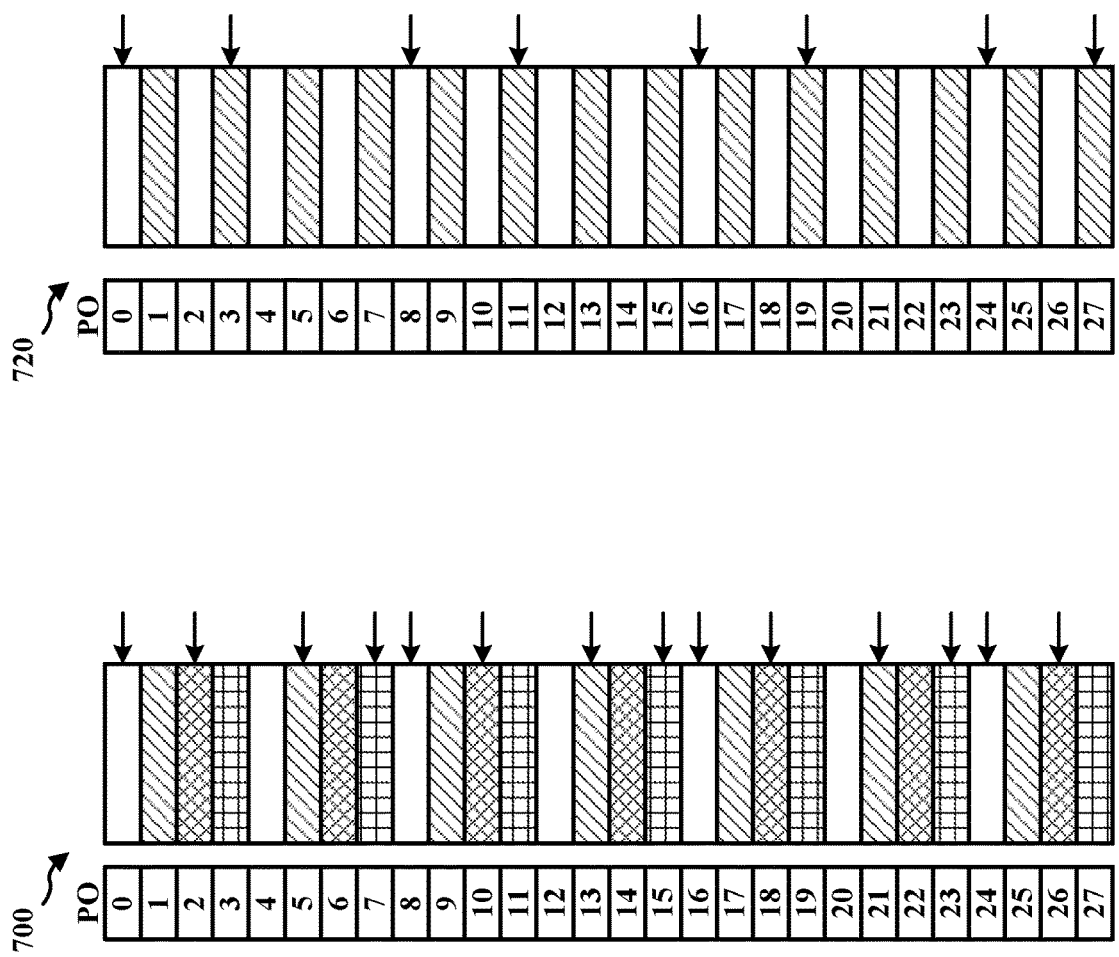
FIG. 7A

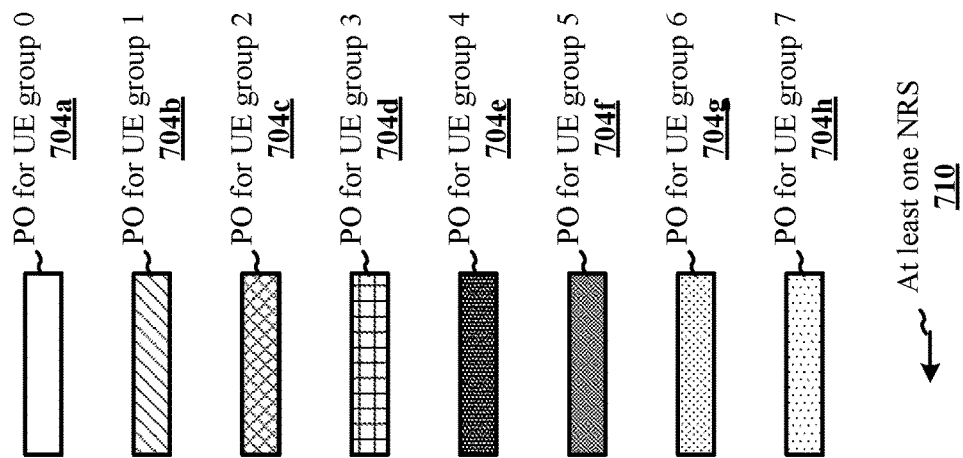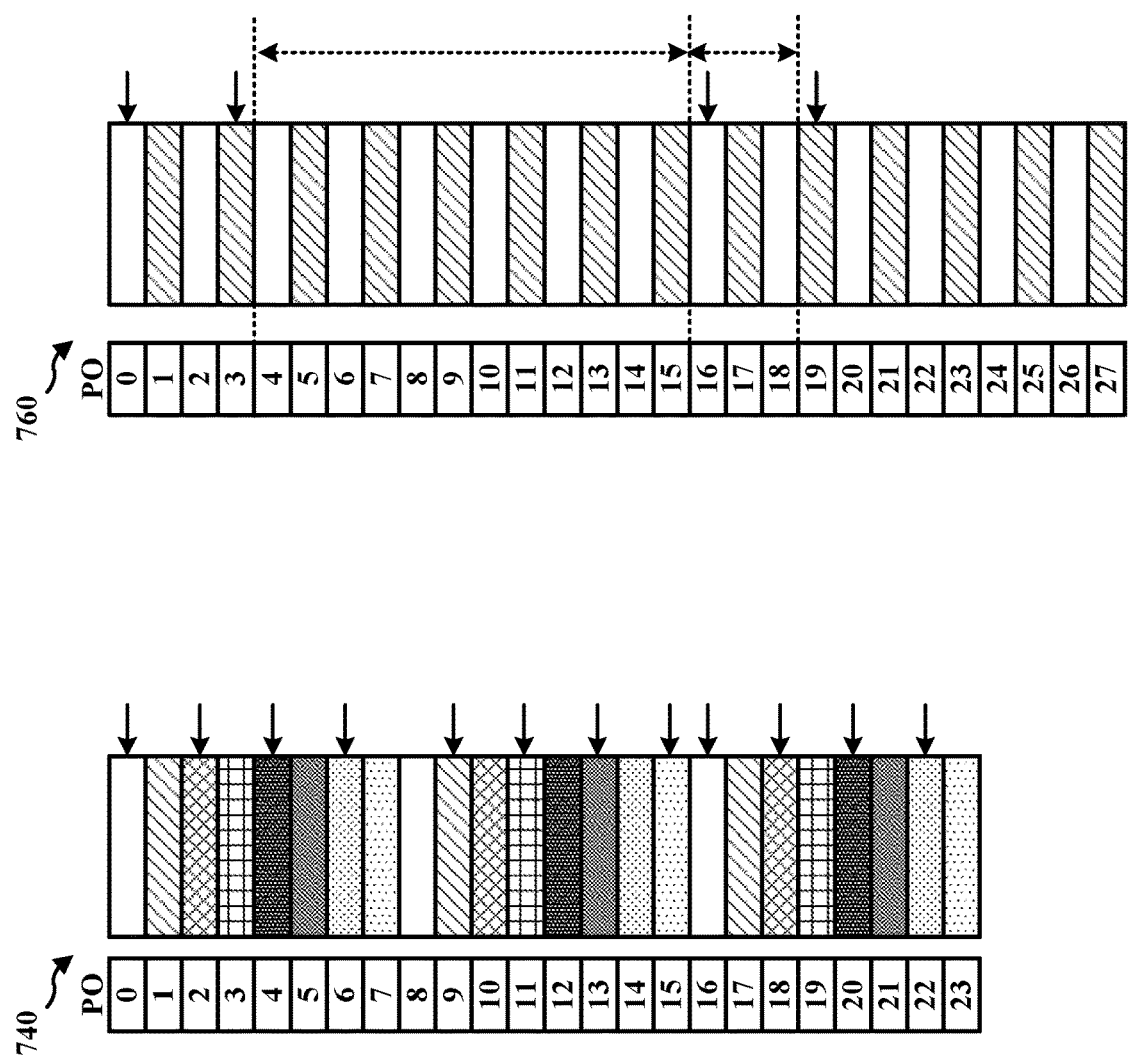
FIG. 7B

FIG. 10A

| | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|
| No grouping (34/40 NRS) | x | | | | | | | | | | | | | | | | x | x | x | x |
| | x | | | | | x | x | x | x | x | x | x | x | x | x | | x | x | x | x |
| Total | x | | | | | x | x | x | x | x | x | x | x | x | x | o | x | x | x | x |
| With grouping (16/40 NRS) | | | | | | | | | | | | | | | | | | | | |
| | | | | | | | | | | | | | | | | | | | | |
| Total | o | o | o | o | o | o | o | o | o | o | o | o | o | o | o | o | o | o | o | o |

(continued)

■ PO for UE group 0 1104a
▨ PO for UE group 1 1104b
▩ PO for UE group 2 1104c
▦ PO for UE group 3 1104d

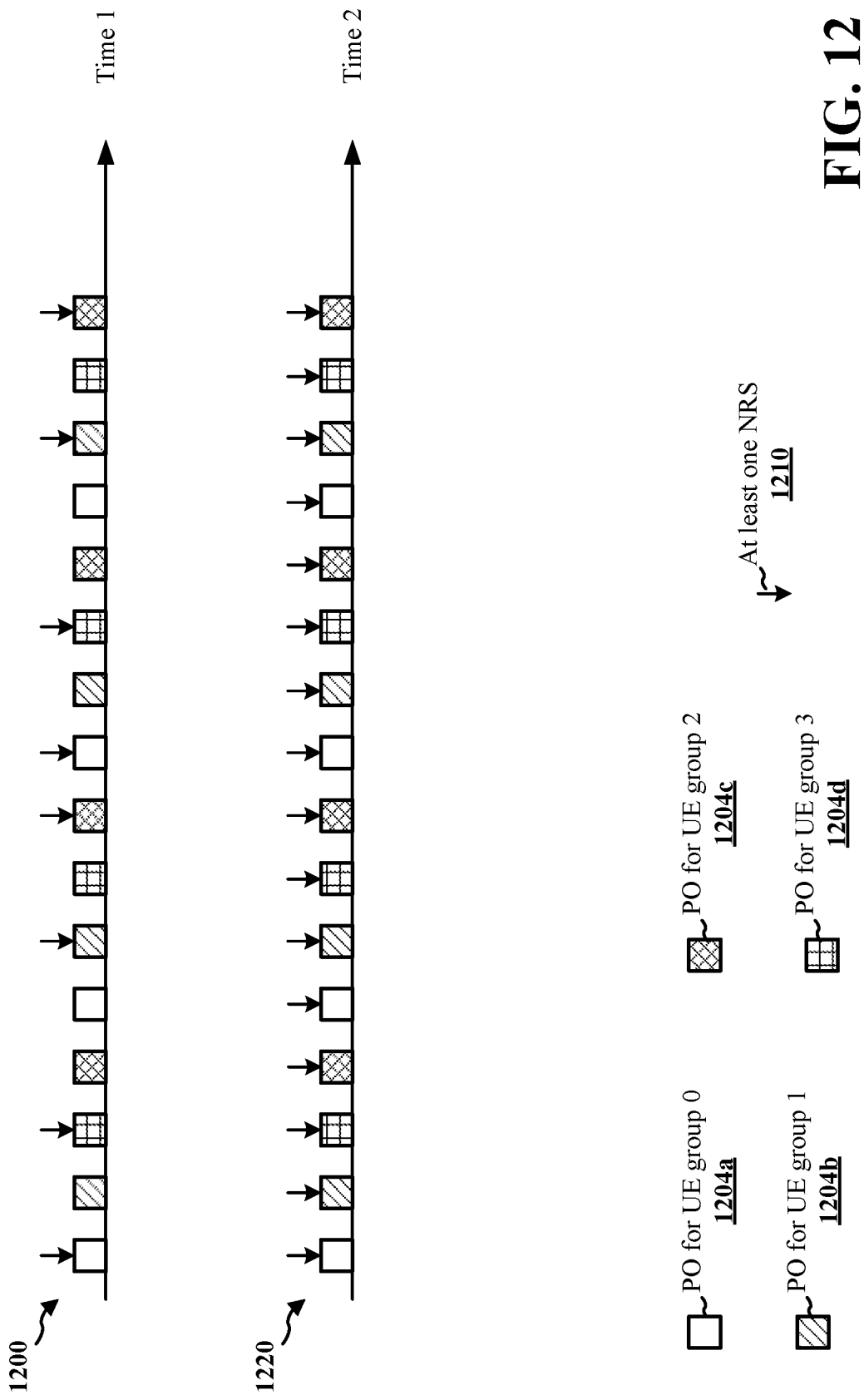

SYSTEM AND METHOD FOR SCHEDULING NARROWBAND REFERENCE SIGNALS IN PAGING OCCASIONS

CROSS REFERENCE TO RELATED APPLICATION(S)

This application claims the benefit of U.S. Provisional Application Ser. No. 62/801,612, entitled "SCHEDULING OF NARROWBAND REFERENCE SIGNALS IN PAGING OCCASIONS" and filed on Feb. 5, 2019, which is expressly incorporated by reference herein in its entirety.

BACKGROUND

Technical Field

The present disclosure relates generally to communication systems, and more particularly, to scheduling narrowband reference signals in paging occasions.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Narrowband (NB) Internet of Things (IoT) (NB-IoT) is a radio access technology (RAT) developed by Third Generation Partnership Project (3GPP) to enable a low-power wide area network for various services provided by various cellular devices (e.g., IoT devices). NB-IoT may use at least a portion of another 3GPP standard, such as Long Term Evolution (LTE), but within a limited bandwidth—e.g., NB-IoT may use a single narrowband of 200 kilohertz (kHz).

According to NB-IoT, an anchor carrier may be included in the single narrowband. The anchor carrier may include a raster (e.g., 100 kilohertz (kHz) raster) that is configured in a set of physical resource blocks (PRBs). In an NB-IoT network, a user equipment (UE) may acquire initial synchronization at least partially based on the anchor carrier. Separate from the anchor carrier, one or more non-anchor carriers may include one or more other narrowbands.

In NB-IoT, some paging messages may be carried on a Narrowband Physical Downlink Control Channel (NPDCCH) in a non-anchor carrier. Thus, a UE may be configured to monitor paging occasions (POs) in the NPDCCH in the non-anchor carrier. During a PO, a base station may send a paging message to the UE and the UE may accordingly detect the paging message. To facilitate detection of the paging message (e.g., through channel estimation), the UE may measure a signal-to-noise ratio (SNR) associated with the PO. In order to do so, the base station may send at least one narrowband reference signal (NRS) in the PO. Unlike paging monitoring in the anchor carrier, the base station may only send NRS in a PO if a paging message is present in that PO. In other words, if the base station does not include a paging message in a PO, then the base station may refrain from transmitting at least one NRS in the PO.

When NRSs are absent from POs in which paging messages are also absent, UEs may experience difficulty in channel estimation and early termination of monitoring the NPDCCH for paging messages. For example, if a UE experiences a 10 decibel (dB) SNR, a single subframe may be sufficient to enable the UE to determine that a paging message is absent from a PO and therefore allow the UE to cease monitoring the NPDCCH during a PO because no paging message is present (e.g., "early termination" of the NPDCCH). However, when the base station does not transmit at least one NRS during the PO, the UE may be unable to detect whether the SNR is relatively low or the at least one NRS is absent from the PO. Consequently, the UE may continue to monitor for a paging message in the PO for a duration of greater than one subframe.

As described in the present disclosure, monitoring for paging messages may incur overhead at the UE (e.g., power consumption and/or processor usage) and, therefore, the UE may benefit from inclusion of at least one NRS in a PO that does not include a paging message. Thus, the present disclosure may provide an approach to including NRSs in POs even when paging messages are absent. For example, the base station may inform UEs of POs that will include NRSs, such as through one or more system information blocks (SIBs). The base station may then broadcast NRSs in POs according to information indicating in the one or more SIBs.

However, generation and transmission of NRSs by the base station may incur overhead at the base station (e.g., power consumption, processor usage, signaling overhead, interference to neighbor cells, etc.). Therefore, while the present disclosure may describe aspects in which NRSs are included in all POs, the present disclosure may further describe aspects in which NRSs are scheduled to be included in a subset of all POs. The scheduling of NRSs may be relatively fair and relatively uniformly spaced. Thus, UEs operating on a cell provided by the base station may be provided with an opportunity to detect NRSs in approximately the same percentage of POs and, if a first PO does not include an NRS, a second PO (either for the same or a different UE) relatively close in time to the first PO may include an NRS to allow a UE to perform SNR estimation (e.g., if the UE transition out of a low-power cycle earlier in order to detect NRS in the second PO). In addition, the NRSs may be scheduled to be approximately uniformly spaced in time, for example, so that POs with NRSs occur at relatively regular intervals.

In an aspect of the disclosure, a method, a computer-readable medium, and an apparatus are provided. The apparatus may be a base station. The base station may calculate a scheduling value based on at least one of a number of groups associated with a set of UEs operating on the cell, a radio frame number, or a subframe number. The base station may send, based on the calculated scheduling value, at least one NRS in at least one PO on a narrowband control channel.

In another aspect of the disclosure, a method, a computer-readable medium, and an apparatus are provided. The apparatus may be a UE operating on a cell provided by a base station. The UE may receive, from the base station providing the cell, information associated with at least one PO for the UE. The UE may determine, based on the received information, scheduling information associated with at least one NRS in the at least one PO. The UE may detect the at least one NRS in the at least one PO on a narrowband control channel when the determined scheduling information indicates the at least one NRS is in the at least one PO. The UE may refrain from detecting for the at least one NRS in the at least one PO on the narrowband control channel when the determined scheduling information indicates the at least one NRS is absent from the at least one PO.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 6 is a block diagram of narrowband reference signals in paging occasions, in accordance with various aspects of the present disclosure.

FIGS. 7A-7B are block diagrams of narrowband reference signals in paging occasions, in accordance with various aspects of the present disclosure.

FIGS. 10A-10B are block diagrams of narrowband reference signals in paging occasions, in accordance with various aspects of the present disclosure.

FIGS. 11A-11B is a block diagram of narrowband reference signals in paging occasions, in accordance with various aspects of the present disclosure.

FIG. 12 is a block diagram of narrowband reference signals in paging occasions, in accordance with various aspects of the present disclosure.

DETAILED DESCRIPTION

Figure 1:
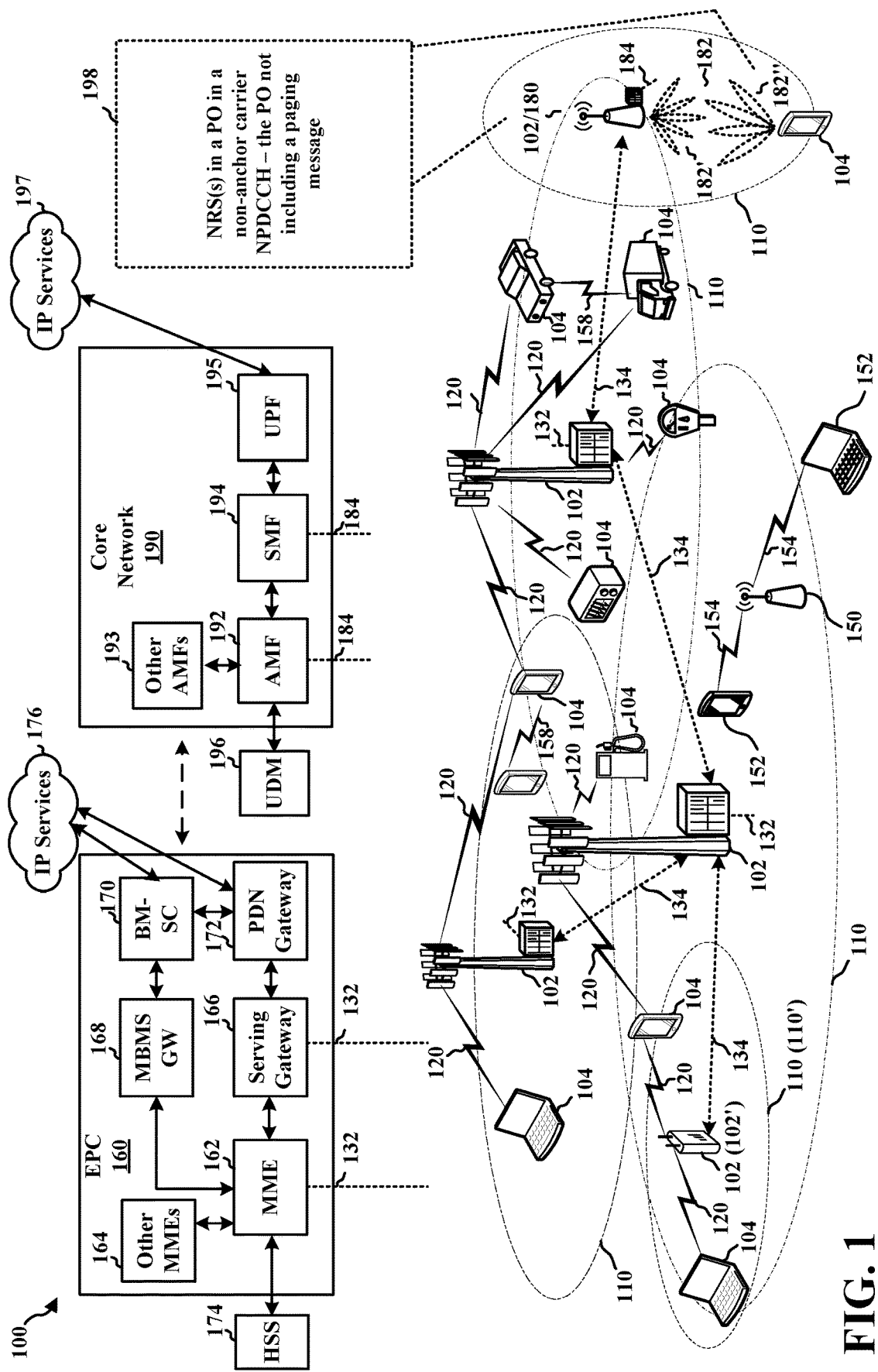
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, a base station 102/180 and a UE 104 may be configured for Narrowband IoT (NB-IoT) communication. With NB-IoT, an anchor carrier may be included in the single narrowband. The anchor carrier may include a raster (e.g., 100 kilohertz (kHz) raster) that is configured in a set of physical resource blocks (PRBs). In an NB-IoT network, the UE 104 may acquire initial synchronization at least partially based on the anchor carrier. Separate from the anchor carrier, one or more non-anchor carriers may include one or more other subbands of the single narrowband.

The base station 102/180 may be configured to calculate a scheduling value based on at least one of a number of groups associated with a set of UEs operating on a cell provided by the base station 102/180 (e.g., a coverage area 110/110'), a radio frame number, and/or a subframe number. Based on the scheduling value, the base station 102/180 may schedule at least one narrowband reference signal (NRS) 198 in a paging occasion (PO) in a non-anchor carrier Narrowband Physical Downlink Control Channel (NPDCCH). The base station 102/180 may schedule the at least one NRS 198 in at least one PO that does not include a paging message. The base station 102/180 may send the at least one NRS 198 in the PO that does not include a paging message in the non-anchor carrier NPDCCH. Further, the base station 102/180 may send information associated with the at least one PO and/or the at least one NRS 198 to the UE 104.

Based on the information associated with the at least one PO and/or the at least one NRS 198 received from the base station 102/180, the UE 104 may monitor the non-anchor carrier NPDCCH for paging messages and/or NRS during the at least one PO. For example, the UE 104 may determine, based on the received information, scheduling information associated with the at least one NRS 198 in the at least one PO. The UE 104 may detect the at least one NRS 198 in the at least one PO in the non-anchor carrier NPDCCH when the determined scheduling information indicates the at least one NRS 198 is in the at least one PO. The UE 104 may monitor for and detect the at least one NRS 198 in a PO even when the PO does not include a paging message intended for the UE 104. In addition, the UE 104 may refrain from attempting to detect the at least one NRS 198 in another PO when the determined scheduling information indicates the at least one NRS 198 is not in the other PO.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu *$ 15 kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
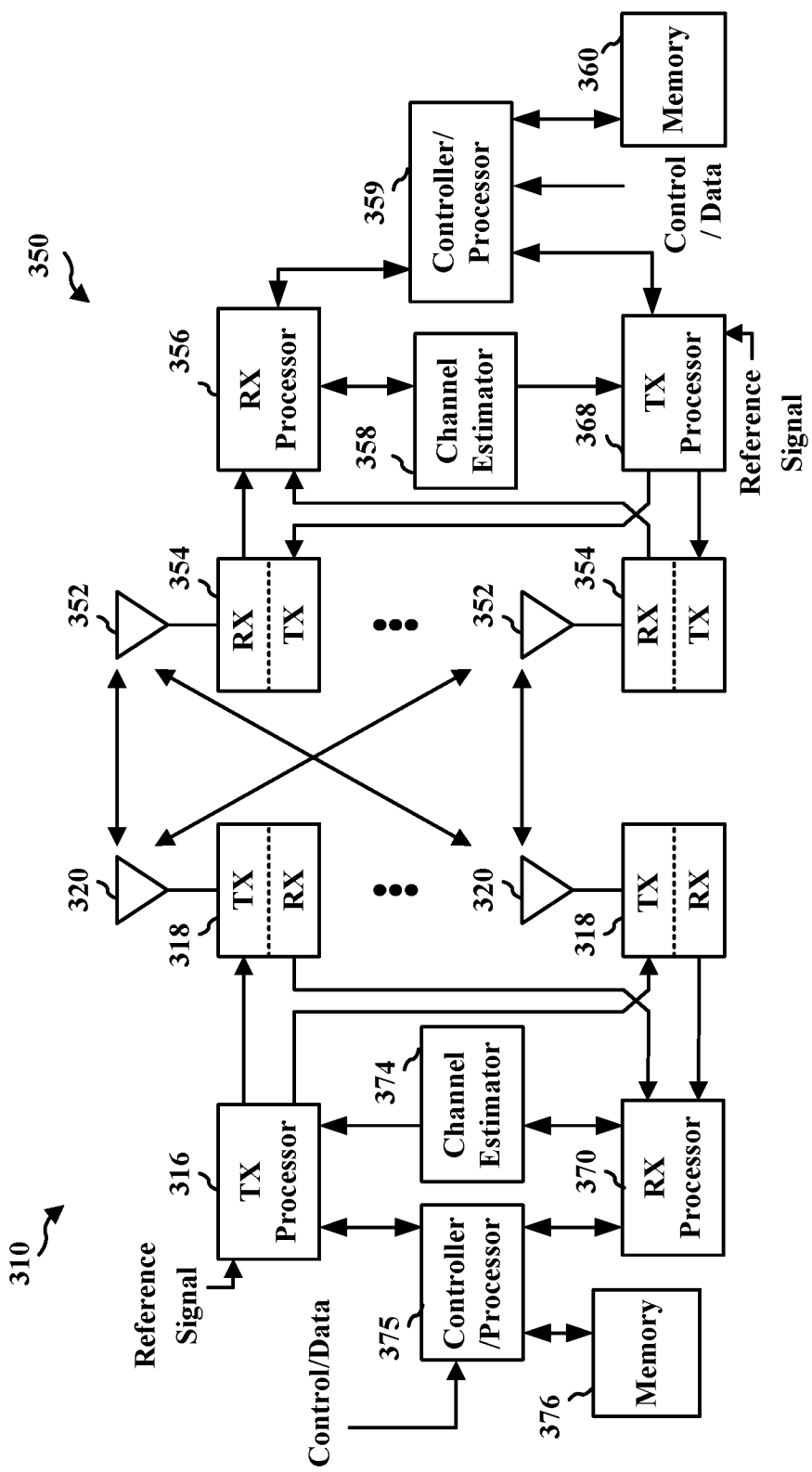
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Referring to FIGS. 4-18, the present disclosure may provide various aspects of NB-IoT communication in which NRSs are transmitted in POs that do not include paging messages. A UE may be configured to monitor POs in the NPDCCH in a non-anchor carrier. During a PO, a base station may send a paging message to the UE and the UE may accordingly detect the paging message. To facilitate detection of the paging message (e.g., through channel estimation), the UE may measure a signal-to-noise ratio (SNR) associated with the PO. In order to do so, the base station may send at least one NRS in the PO. Unlike paging monitoring in the anchor carrier, the base station may only send NRS in a PO if a paging message is included in that PO. In other words, if the base station does not include a paging message in a PO, then the base station may refrain from transmitting at least one NRS in the PO.

When NRSs are absent from POs in which paging messages are also absent, UEs may experience difficulty in channel estimation and early termination of monitoring the NPDCCH for paging messages. For example, if a UE experiences a 10 decibel (dB) SNR, a single subframe may be sufficient to enable the UE to determine that a paging message is absent from a PO and therefore allow the UE to cease monitoring the NPDCCH during a PO because no paging message is present (e.g., "early termination" of the NPDCCH). However, when the base station does not transmit at least one NRS during the PO, the UE may be unable to detect whether the SNR is relatively low or the at least one NRS is absent from the PO. Consequently, the UE may continue to monitor for a paging message in the PO for a duration of greater than one subframe.

As described herein and particularly with respect to FIGS. 4-18, monitoring for paging messages may incur overhead at the UE (e.g., power consumption and/or processor usage) and, therefore, the UE may benefit from inclusion of at least one NRS in a PO that does not include a paging message. Thus, FIGS. 4-18 may provide an approach to including NRSs in POs even when paging messages are absent. For example, the base station may inform UEs of POs that will include NRSs, such as through one or more SIBs. Illustratively, the presence of NRS on subframes which will contain NRS even when no paging NPDCCH is transmitted may be enabled by SIB. The base station may then broadcast NRSs in POs according to information indicating in the one or more SIBs.

However, generation and transmission of NRSs by the base station may incur overhead at the base station (e.g., power consumption, processor usage, signaling overhead, etc.). Therefore, while the present disclosure may describe aspects in which NRSs are included in all POs, FIGS. 4-18 may further describe aspects in which NRSs are scheduled to be included in a subset of all POs. Subframes that will contain NRS even when no paging NPDCCH is transmitted may be associated to a PO (e.g., either from the UE perspective or the network perspective). A subset of the POs have associated subframes that may contain NRS even when no paging NPDCCH is transmitted.

The scheduling of NRSs may be relatively fair and relatively uniformly spaced. Thus, UEs operating on a cell provided by the base station may be provided with an opportunity to detect NRSs in approximately the same percentage of POs and, if a first PO does not include an NRS, a second PO (either for the same or a different UE) relatively close in time to the first PO may include an NRS to allow a UE to perform SNR estimation (e.g., if the UE transition out of a low-power cycle earlier in order to detect NRS in the second PO). In addition, the NRSs may be scheduled to be approximately uniformly spaced in time, for example, so that POs with NRSs occur at relatively regular intervals.

Figure 4:
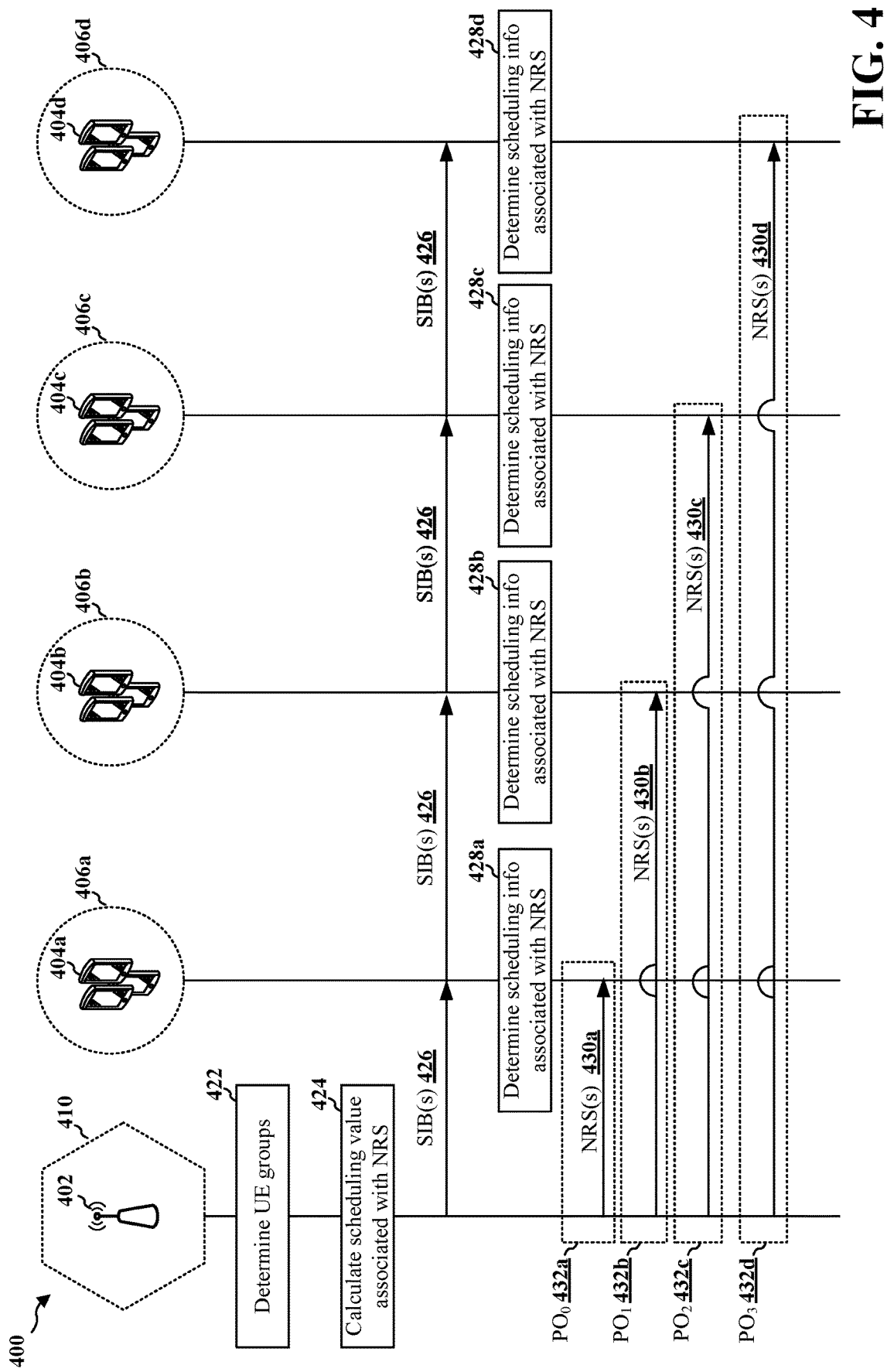
FIG. 4 is a call flow diagram of a wireless communications system.

FIG. 4 is a call flow diagram illustrating a wireless communication system 400 in which NRSs are scheduling during POs that do not include paging messages, according to various aspects of the present disclosure. The wireless communication system 400 may include a base station 402 and a plurality of UEs 404*a*, 404*b*, 404*c*, 404*d*. The base station 402 may be configured to provide a cell 410, for example, for NB-IoT communication. The UEs 404*a*, 404*b*, 404*c*, 404*d* may operate on the cell 410.

Each of the UEs 404*a*, 404*b*, 404*c*, 404*d* may be uniquely identified according to a respective UE ID. Each UE ID may be based on a corresponding international mobile subscriber identity (IMSI). In some aspects, each of the UEs 404*a*, 404*b*, 404*c*, 404*d* may calculate a respective UE ID according to a modulo (mod) operation: UE ID=IMSI modulo 1024 or, equivalently, UE ID=IMSI % 1024.

The UEs 404*a*, 404*b*, 404*c*, 404*d* may be separated into groups 406*a*, 406*b*, 406*c*, 406*d* of UEs. As illustrated, the first UE 404*a* may be separated into a first group 406*a*, the second UE 404*b* may be separated into a second group 406*b*, the third UE 404*c* may be separated into a third group 406*c*, and the fourth UE 404*d* may be separated into a fourth group 406*d*. The UE groups 406*a*, 406*b*, 406*c*, 406*d* may include one or more other UEs, in addition to the UEs 404*a*, 404*b*, 404*c*, 404*d* respectively.

In some aspects, the base station 402 may determine 422 the UE groups 406*a*, 406*b*, 406*c*, 406*d*. That is, the base station 402 may determine which of the UE groups 406*a*, 406*b*, 406*c*, 406*d* into which a UE should be separated. The base station 402 may determine 422 the UE groups 406*a*, 406*b*, 406*c*, 406*d* based on one or more parameters, such as characteristics and/or capabilities of the UEs 404*a*, 404*b*, 404*c*, 404*d*. In some aspects, the base station 402 may receive the one or more parameters from another system, such as an MME (e.g., the MME 162 of FIG. 1).

The base station 402 may schedule respective POs for each of the UEs 404*a*, 404*b*, 404*c*, 404*d*. In one aspect, the base station 402 may schedule the respective POs for each of the UEs 404*a*, 404*b*, 404*c*, 404*d* by scheduling POs 432*a*, 432*b*, 432*c*, 432*d* for each of the groups 406*a*, 406*b*, 406*c*, 406*d* that respectively include each of the UEs 404*a*, 404*b*, 404*c*, 404*d*. Each of the POs 432*a*, 432*b*, 432*c*, 432*d* may include a set of subframes in which the a corresponding one of the UEs 404a, 404b, 404c, 404d may monitor for and detect a respective paging message intended for the corresponding one of the UEs 404a, 404b, 404c, 404d. Each of the POs 432a, 432b, 432c, 432d may be located in an NPDCCH that is not located in an anchor carrier associated with NB-IoT.

In some aspects, at least one of the POs 432a, 432b, 432c, 432d may be scheduled in association with a discontinuous reception (DRX) cycle of a corresponding one of the UEs 404a, 404b, 404c, 404d. For example, the first UE 404a may be configured to transition from a low-power DRX state (e.g., a "sleep" state) to a high-power DRX state (e.g., a "wake" state) during the first PO 432a. The first UE 404a may then transition back to the low-power DRX state, for example, after the first PO 432a or during the first PO 432a if there is no paging message intended for the first UE 404a in the first PO 432a.

The base station 402 may configure respective DRX cycles and/or POs for each of the UEs 404a, 404b, 404c, 404d. For example, the base station 402 may signal information indicating a respective DRX cycle in at least one SIB(s) 426 or via RRC signaling. In addition or alternatively, the base station 402 may signal information indicating a respective PO 432a, 432b, 432c, 432d in at least one SIB(s) 426 or via RRC signaling. In some aspects, a respective DRX cycle and/or respective PO 432a, 432b, 432c, 432d may be configured for a respective UE group 406a, 406b, 406c, 406d. Accordingly, each of the UEs 404a, 404b, 404c, 404d may be configured to "wake" at a respective time to monitor a respective PO 432a, 432b, 432c, 432d for paging messages and/or NRS. Potentially, one or more of the UEs 404a, 404b, 404c, 404d may be configured to "wake" at a respective time in response to wake up signaling (WUS) (e.g., from the base station 402) to monitor a respective PO 432a, 432b, 432c, 432d for paging messages and/or NRS.

In some aspects, the UEs 404a, 404b, 404c, 404d may determine a paging frame (PF), PO, and paging narrowband (PNB) based on DRX parameters provided in the SIB(s) 426. Specifically, the PF may be given by $$SFN \% T = \left(\frac{T}{N}\right)(UE\ ID\ \%\ N),$$

where T is a DRX cycle of a UE, and N is min(T, nB). In some aspects, the number of the UE groups 406a, 406b, 406c, 406d nB may be associated with T—e.g., nB may be equal to $$4T, 2T, T, \frac{T}{2}, \frac{T}{4}, \frac{T}{8}, \frac{T}{16}, \frac{T}{32}, \frac{T}{64}, \frac{T}{128}, \frac{T}{256},$$

and for NB-IoT also $$\frac{T}{512}\ \text{and}\ \frac{T}{1024}.$$

The index of the subframe within a radio frame to be monitored by a UE for a paging message $i_s$ is equal to $$\left\lfloor \frac{UE\ ID}{N} \right\rfloor \% Ns,$$

where $$Ns = \max\left(1, \left(\frac{nB}{T}\right)\right)$$

and for Ns>1 (which implies values of nB in {4T, 2T}), otherwise $i_s$=0. For N and T, $$SFN \% T = \left(\frac{T}{N}\right)(UE\ ID\ \%\ N).$$

Then if nB≥T, N=min(T, nB)=T, or equivalently SFN % T=(UE ID % T), which means that all radio frames have paging, and the UE-specific offset for a PO is determined by the UE ID modulo T. However, if nB<T, N=min(T, nB)=nB, or equivalently SFN % T=X×(UE ID % nB), which means that there are X cell-specific POs in one DRX cycle that are uniformly distributed because they are of the form $$X \times UE\ ID\ \%\frac{T}{X} = X \times 1, X \times 2, \ldots, T - X.$$

A given UE may have the same offset for every DRX cycle.

The lengths of each PO 432a, 432b, 432c, 432d may be separately configured. For example, the length of the first PO 432a may be $W_0$, which may be different from the length of the second PO 432b $W_1$ and/or different from the length of the third PO 432c $W_2$. The paging carrier may be based on the respective W. For example, the paging carrier may be equal to $$\left\lfloor \frac{UE\ ID}{(N \times NS)} \right\rfloor \% W < W_0, W_1, W_2, \ldots$$

In various aspects, the base station 402 may be configured to send at least one NRS in each of the POs 432a, 432b, 432c, 432d even when each of the POs 432a, 432b, 432c, 432d does not include a paging message intended for a respective one of the UEs 404a, 404b, 404c, 404d. The base station 402 may be configured to indicate, through broadcast signaling, the presence of NRS(s) on subframes which will contain NRS(s) even when no paging NPDCCH is transmitted (e.g., for non-anchor carriers).

When included in a PO, an NRS may facilitate channel estimates/measurements by each of the UEs 404a, 404b, 404c, 404d, such as SNR estimates. Based on at least one channel estimate/measurement, at least one of the UEs 404a, 404b, 404c, 404d may be configured to perform "early termination" of the NPDCCH, thereby reducing overhead of the at least one UE 404a, 404b, 404c, 404d by reducing the number of subframes the at least one UE 404a, 404b, 404c, 404d will receive and decode during a PO that may not include a paging message intended for the at least one UE 404a, 404b, 404c, 404d. Various aspects of NRS transmission may be described, infra, with respect to FIGS. 5-18.

According to some aspects, one or more of the UEs 404a, 404b, 404c, 404d may be configured for a "narrowband wake up signal" (NWUS), which may preserve UE energy by indicating whether a paging indicator will be sent in an associated PO. The NWUS may be a single bit: one value indicating a UE should wake to receive a paging indicator in a PO, and another value indicating the UE may sleep because the paging indicator is absent from a PO. Potentially, a NWUS may be associated with more than one PO for even greater power savings. In one configuration, if NWUS is enabled (e.g., from the network perspective), there may be no NRS for NPDCCH early termination, but there may be NRS for NWUS early termination. In another aspect, if NWUS is enabled (e.g., from UE perspective, such that NWUS is enabled by the network and supported by a UE), there may be no NRS for NPDCCH early termination, but there may be NRS for NWUS early termination. In a further configuration, the configuration of NRS for NPDCCH early termination and NWUS early termination may be decoupled (e.g., the base station 402 may enable NRS for NWUS and disable NRS for NPDCCH, or vice versa). In still another configuration, NRS may be always associated with NPDCCH for paging. For the issue of NRS presence for NPDCCH early termination when NWUS is enabled, there may be down-selection among: decoupling of configuration of NRS for NPDCCH early termination and NWUS early termination (e.g., the base station 402 may enable NRS for NWUS and disable for NPDCCH, or vice versa) and/or NRS is always associated with NPDCCH for paging. Potentially, the presence of cell-specific reference signal (CRS) may be enabled in non-anchor carriers in subframes not containing NRS and/or CRS may be available in all subframes where the NRS are available.

According to still further aspects, if the POs that have associated subframe which will contain NRS even when no paging NPDCCH is transmitted for NPDCCH early termination: NRS may be present in the first M subframes out of the 10 NB-IoT downlink subframes before the PO, and the N first NB-IoT downlink subframes of the NPDCCH search space. Potentially, the subset of POs that have associated subframes which will contain NRS even when no paging NPDCCH is transmitted may be the whole set of POs.

In some aspects, the base station 402 may be configured to schedule the NRS(s) 430a, 430b, 430c, 430d based on a scheduling value (e.g., offset). For example, the base station 402 may be configured to schedule one or more of the NRSs 430a, 430b, 430c, 430d based on an offset and/or based on a PO Index. Potentially, the offset may be based on an SFN and/or hyper-SFN (H-SFN), where an H-SFN may correspond to one SFN cycle (e.g., 10.24 seconds) or 1024 frames. By way of illustration, the PO index may be equal to $$PO_{index} = \left(\frac{SFN}{T} \times nB + i_s\right) \% nB$$

and the offset may be equal to offset=⌊(SFN+1024×H-SFN)/T⌋%2, where SFN is the SFN corresponding to the PO.

Figure 5:
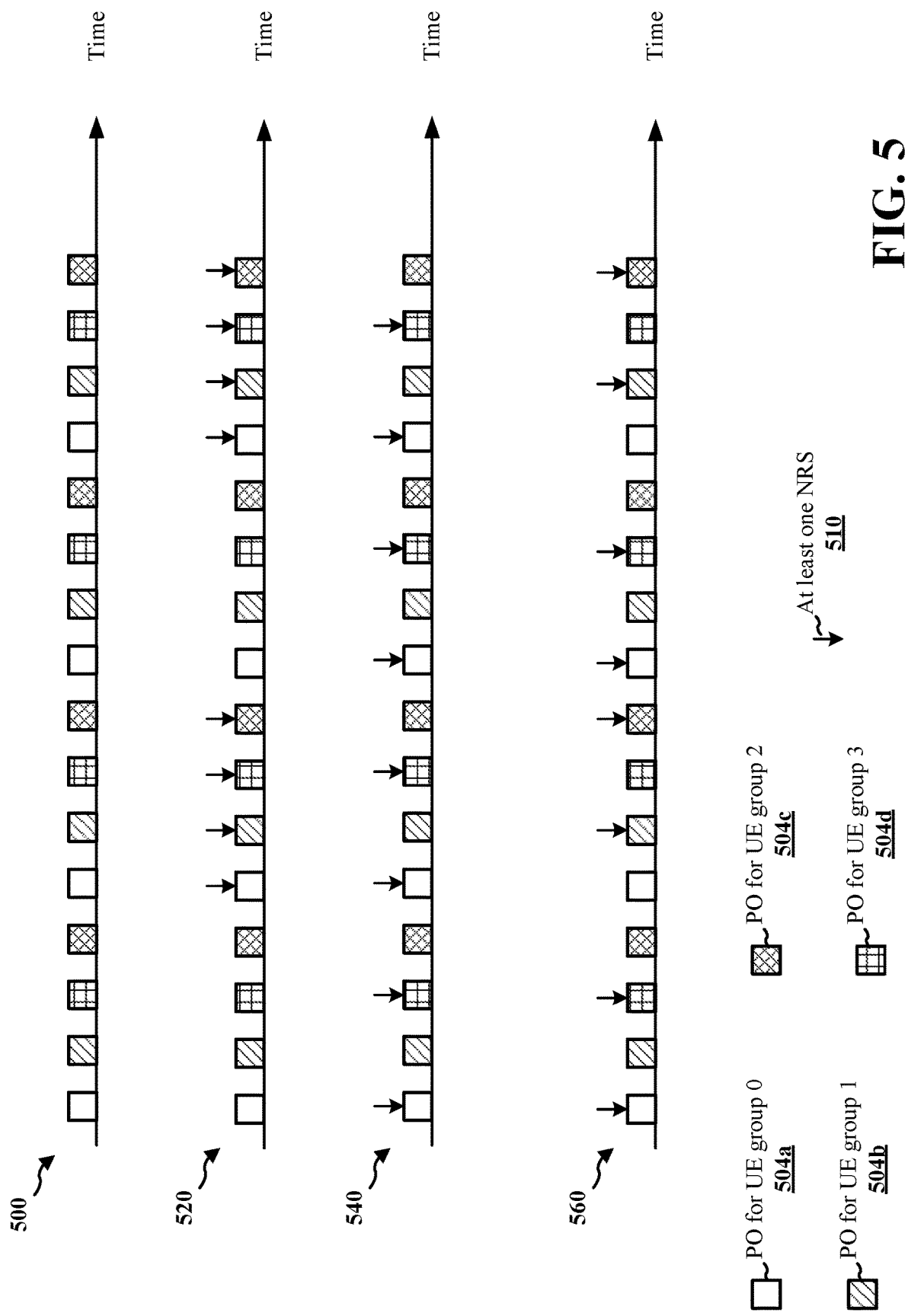
FIG. 5 is a block diagram of paging occasions for UEs.

In so doing, the base station 402 may attempt to provide fairness and uniformity of NRS transmission. For example, the base station 402 may attempt to provide fairness of NRS transmission, the base station 402 may schedule the NRS(s) 430a, 430b, 430c, 430d such that each of the UEs 404a, 404b, 404c, 404d is scheduled with the NRS(s) 430a, 430b, 430c, 430d in approximately the same percentage of POs 432a, 432b, 432c, 432d. In addition, the base station 402 may attempt to provide uniformity by scheduling the NRS(s) 430a, 430b, 430c, 430d with approximately uniform spacing in time, which may enable periodic measurements by each of the UE 404a, 404b, 404c, 404d. FIG. 5, infra, may illustrate an aspect of NRS scheduling 560 that provides relative fairness and uniformity of NRS transmission to UEs of different groups.

However, if the base station 402 is unable to schedule NRS(s) for one UE group (e.g., the first group 406a), the base station 402 may schedule NRS(s) in a PO (e.g., the second PO 432b) of a different UE group (e.g., the second UE group 406b) that is as close as possible to the PO (e.g., the first PO 432a) of the one UE group. Thus, a UE of the one group (e.g., the first group 406a) may wake during the PO of the other UE group to detect NRSs and perform SNR estimation based on the NRS.

The base station 402 may calculate 424 the scheduling value based on at least one of a number of the UE groups 406a, 406b, 406c, 406d, a radio frame number, or a subframe number. In some aspects of calculating 424 the scheduling value based on at least the number of the UE groups 406a, 406b, 406c, 406d, the base station 402 may calculate 424 the scheduling value based on a respective index associated with a respective PO 432a, 432b, 432c, 432d, and a based on a rate value R that is associated with a periodicity at which a respective NRS(s) 430a, 430b, 430c, 430d is transmitted in the respective PO 432a, 432b, 432c, 432d. In other words, the rate value R may be the fraction of POs that have an NRS.

In some aspects, the rate value R may be defined according to the PO index and/or offset. For example, R may be equal to R=(PO$_{index}$+offset)%2. Then, if R is equal to 1, the respective PO 432a, 432b, 432c, 432d may include a corresponding one of NRS(s) 430a, 430b, 430c, 430d. If, however, if R is equal to 0, the respective PO 432a, 432b, 432c, 432d may not be associated with a corresponding one of NRS(s) 430a, 430b, 430c, 430d.

A "decimation pattern" may be the pattern that determines which POs have subframes with NRS even when no NPDCCH is transmitted. The decimation pattern may be configured according to one or more factors: (1) the decimation pattern may be fair across UEs (e.g., all UEs see the same/similar percentage of POs with NRS); (2) a UE belonging to a given UE group (e.g., a UE group that monitors paging in the same PO) may use NRS belonging to a PO of a different group in addition to the NRS of that UE's own UE group (e.g., the maximum gap between PO with NRS and the PO the UE monitors is not larger than X, which may ensure that the UE can reliably estimate the SNR for NPDCCH early termination); (3) the POs with NRS are quasi-uniformly/uniformly distributed from UE perspective; and/or (4) the POs with NRS are quasi-uniformly/uniformly distributed from network perspective. In some aspects, the decimation pattern may be based on the UE-specific DRX cycle.

A "decimation factor" may be the fraction of POs that have NRS. The decimation factor may be: (1) T/2, then decimation factor is ½; (2) T, then decimation factor is ½; (3) 2T, then decimation factor is ½; and (4) 4T, then decimation factor is ½.

In some aspects of a pattern for NRS transmission, a pattern (M, N) may be defined depending on the value of nB. For example, if nB≥X, the decimation pattern/M/N may be specified for each nB and/or the decimation/N/M pattern may provide for 10 subframes with NRS nearby every PO, such as after decimation pattern from the network perspective (e.g., the value of M/N may be different for different POs within a DRX cycle). If nB<X, all POs may have NRS (e.g., X may be T/2) and/or the value of M+N may be equal to 10 (e.g., the values of M and N may be configurable). In some aspects, if nB<T/2, M=10 and N=0. In some other aspects, the values of M/N for nB≥T/2 may be: (1) nB=4T, then M is 1 and N is 0; (2) nB=2T, then M is 2 and N is 0; (3) nB=T, then M is 5 and N is 0; (4) nB=T/2, then M is 10 and N is 0.

In one aspect, the base station 402 may include information indicating the number of UE groups 406a, 406b, 406c, 406d and/or information indicating the rate value R in at least one SIB(s) 426. This information indicating nB and/or R may be explicitly or implicitly signaled (e.g., for implicitly signaling, of R, may be derivable based on nB and one or more other parameters). The rate value R may be based on values N and T, and at least one of N and/or T may be signaled to the UEs 404a, 404b, 404c, 404d, for example, in the SIB(s) 426. In various aspects, for a relatively low DRX cycle (e.g., a relatively short T), the rate value R may be relatively large. However, for relatively higher DRX cycles (e.g., relatively longer T), the spacing between POs of a UE group may be relatively long and therefore the need to reduce the number of NRS(s) may be reduced (e.g., because less overhead may be incurred due to the relatively infrequency NRS(s) transmission).

In another aspect, the base station 402 may include information indicating the scheduling value (e.g., offset) in at least one SIB(s) 426. In a further aspect, the base station 402 may include information indicating a respective duration (e.g., a number of frames or subframes) between a respective first PO 432a, 432b, 432c, 432d that includes the respective NRS(s) 430a, 430b, 430c, 430d and a next respective PO that includes respective NRS(s) in at least one SIB(s) 426. For example, the base station 402 may indicate the spacing (e.g., in a number of radio frames) between two consecutive POs with NRS(s) of the same UE group. In another example, the base station 402 may signal the average spacing (e.g., in a number of radio frames) between two consecutive POs with NRS(s) of the same UE group. In such an example, the average spacing may be equivalent to X×R.

Based on information received from the base station 402 (e.g., in at least one SIB(s) 426), the UEs 404a, 404b, 404c, 404d of each group 406a, 406b, 406c, 406d respectively, may determine 428a, 428b, 428c, 428d scheduling information associated with the respective NRS(s) 430a, 430b, 430c, 430d in the respective POs 432a, 432b, 432c, 432d. The UEs 404a, 404b, 404c, 404d of each group 406a, 406b, 406c, 406d, respectively, may detect the respective NRS(s) 430a, 430b, 430c, 430d in the respective POs 432a, 432b, 432c, 432d when the respectively determined 428a, 428b, 428c, 428d scheduling information indicates the respective PO 432a, 432b, 432c, 432d includes the respective NRS(s) 430a, 430b, 430c, 430d. However, when the determined 428a, 428b, 428c, 428d scheduling information indicates that the respective PO 432a, 432b, 432c, 432d does not include the respective NRS(s) 430a, 430b, 430c, 430d, then the UEs 404a, 404b, 404c, 404d of each group 406a, 406b, 406c, 406d, respectively, may refrain from detecting for the respective NRS(s) 430a, 430b, 430c, 430d, which may reduce overhead of UEs of the group to which NRS(s) are not transmitted.

In various aspects, the POs 432a, 432b, 432c, 432d may periodically occur based on the number of UE groups 406a, 406b, 406c, 406d, and the number of UE groups 406a, 406, 406c, 406d may be referred to as nB. For example, for a group $G_i$, the corresponding POs may be i, i+nB, i+2nB, i+3nB, i+4nB, i+5nB, i+6nB, i+7nB, i+8nB, . . . The base station 402 may include NRS(s) in one out of every R (rate value), but the scheduling value (e.g., offset) may be different for each group $G_i$. For example, for the first UE group 406a, the scheduling value may be 0 (e.g., a 0 offset), and so the NRS(s) 430a may occur during the PO 432a at i, i+2nB, i+4nB, i+6nB, i+8nB, . . . However, for the second UE group 406b, the scheduling value may be 1 (e.g., a 1 offset), and so the NRS(s) 430b may occur during the PO 432b at i+nB, i+3nB, i+5nB, i+7nB, . . .

Thus, in general, for a scheduling value being an offset $O_i$, the POs with NRS may be i+(kR+$O_i$)nB,k∈Z, where i corresponds to the number of the one of the UE groups 406a, 406b, 406c, 406d, k is a scalar of any integer Z, R is a rate value associated with the periodicity at which NRS(s) are included in POs, and nB is the number of the UE groups 406a, 406b, 406c, 406d. Accordingly, the set of POs with NRS P is P={PO|∃kPO=i+(kR+$O_i$)×nB,k∈Z}. In other words, POs having NRS(s) may meet the condition of Equation 1. As used in the Equations herein, PO may refer to the PO index beginning with 0, and the POs meeting the Equations condition will be the ones with NRS.

$$(PO - PO\% \; nB - O_i \times nB)\% RnB = 0, \text{ where } i = PO\%nB \quad \text{Equation 1}$$

In a first configuration of NRS scheduling for a scheduling value being an offset $O_i$, the offset $O_i$ may be $O_i=0 \forall i$. Thus, the offset $O_i$ may be 0. Accordingly, the set of POs with NRS may meet the condition of Equation 2, which may be illustrated, infra, with respect to FIG. 6.

$$(PO - PO\%nB)\%RnB = 0 \quad \text{Equation 2}$$

In a second configuration of NRS scheduling for a scheduling value being an offset $O_i$, the offset $O_i$ may be $O_i=i \forall i$. Accordingly, the set of POs with NRS may meet the condition of Equation 3, which may be illustrated, infra, with respect to FIGS. 7A-7B.

$$(PO - PO\%nB - (PO\%nB) \times nB)\% RnB = 0 \quad \text{Equation 3}$$

In a third configuration of NRS scheduling for a scheduling value being an offset $O_i$, the offset $O_i$ may be based on a maximum between 1 and the rate value R divided by the number of groups. Accordingly, the set of POs with NRS may meet the condition of Equation 4, which may be illustrated, infra, with respect to FIG. 8.

$$\left(PO - PO\%nB - (PO\%nB) \times nB \times \max\left\{1, \frac{R}{nB}\right\}\right)\%RnB = 0 \quad \text{Equation 4}$$

In a fourth configuration of NRS scheduling for a scheduling value being an offset $O_i$, the offset $O_i$ may be based on negating a maximum between 1 and the rate value R divided by the number of groups. In other words, the offset $$O_i = (nB - 1 - i) \times \max\left\{1, \frac{R}{nB}\right\}.$$

Figure 9:
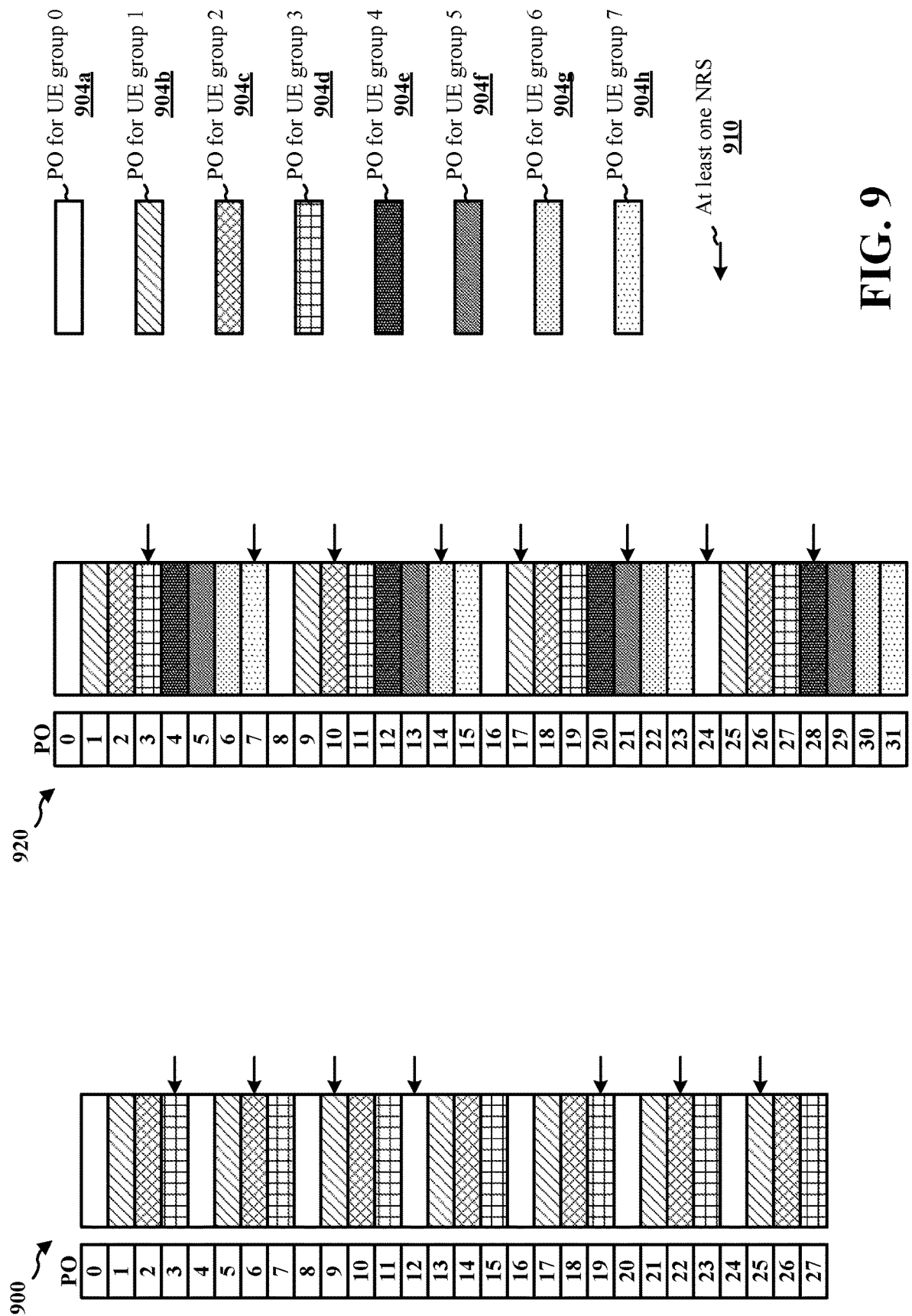
FIG. 9 is a block diagram of narrowband reference signals in paging occasions, in accordance with various aspects of the present disclosure.
Figure 10A:
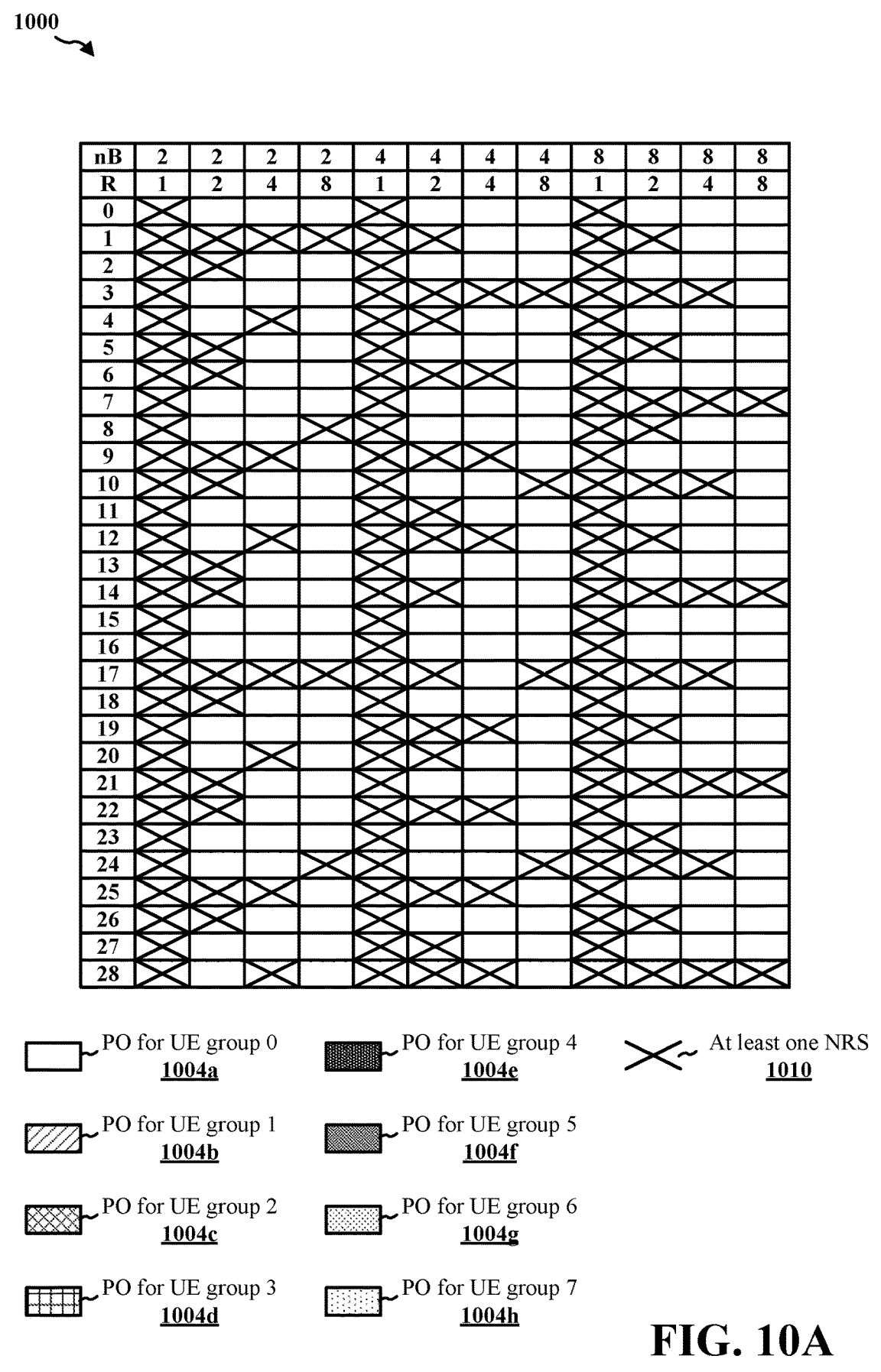
Figure 10B:
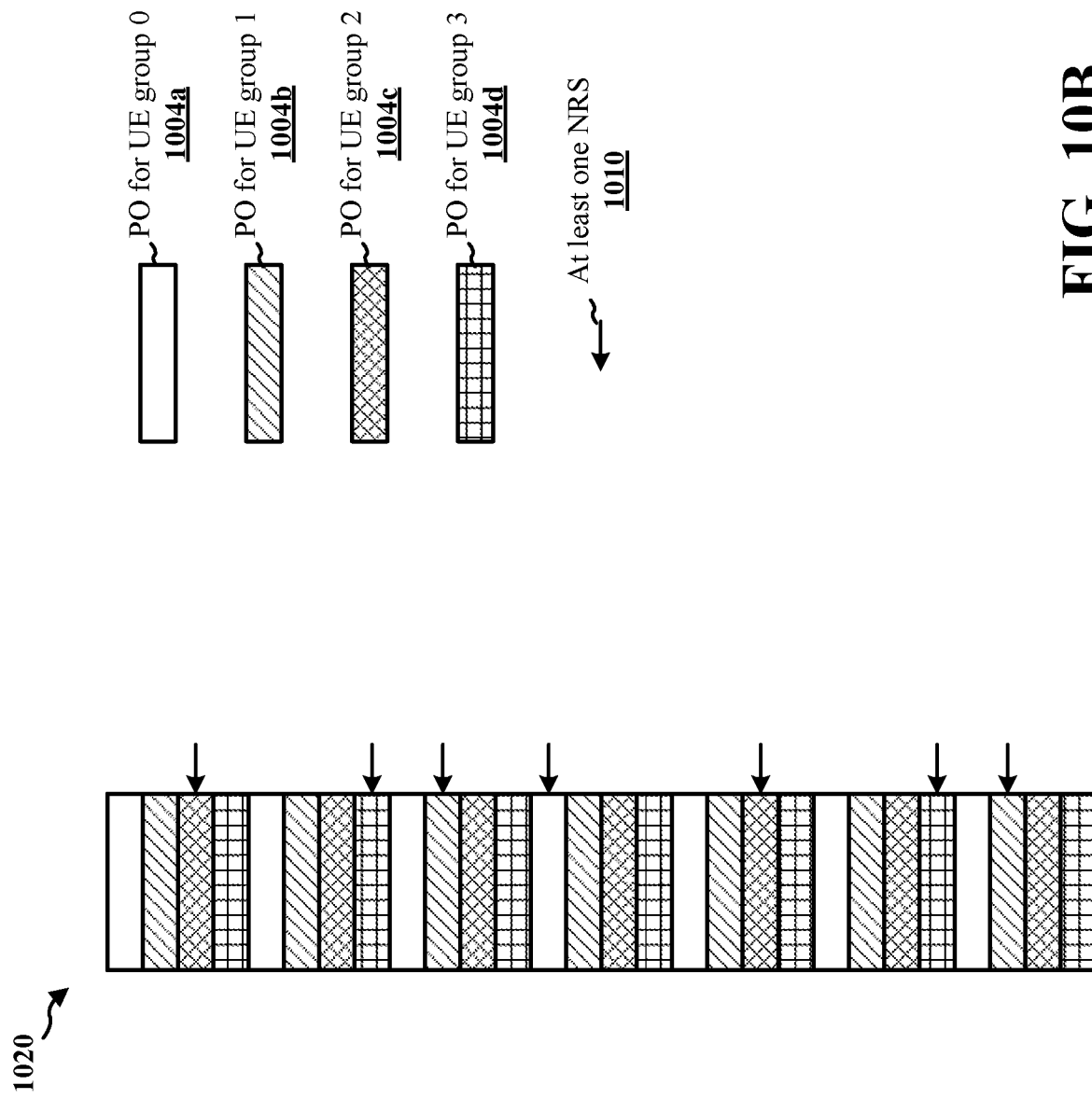

Accordingly, the set of POs with NRS may meet the condition of Equation 5, which may be illustrated, infra, with respect to FIGS. 9 and 10A-10B.

$$\left(PO - PO\%nB - nB \times \left((nB - 1 - (PO\%nB)) \times \max\left\{1, \frac{R}{nB}\right\}\right)\right)\%RnB = 0 \quad \text{Equation 5}$$

In view of the foregoing configurations, NRS scheduling for a scheduling value being an offset $O_i$ may use an equation (e.g., one of Equations 1 through 5) to calculate 424 the offset $O_i$. However, an offset $O_i$ may be differently determined according to other configurations. In another configuration, the base station 402 may determine a respective offset $O_i$ for different carriers. The base station 402 may then signal a respective offset $O_i$ for a respective carrier to at least one of the UE groups 406a, 406b, 406c, 406d, which may have a respective one of the POs 432a, 432b, 432c, 432d scheduled in the respective carrier. The base station 402 may explicitly signal the respective offset $O_i$ to at least one of the UE groups 406a, 406b, 406c, 406d, for example, in the SIB(s) 426 or via RRC signaling.

In still another configuration, the base station 402 may calculate 424 an offset $O_i$ based on an offset that is associated with the ID of the cell 410. For example, the offset $O_i$ may be based on the ID of the cell 410 $N_{ID}^{Ncell}$ or the offset $O_i$ may be another value $O_{offset}$ that is different from an offset used in a neighboring cell for NRS(s) transmission in POs, which may mitigate inter-cell interference. In some aspects, the offset $O_{offset}$ may be signaled by the base station 402 (e.g. in SIB). In one such configuration, the NRS scheduling for a scheduling value being an offset $O_i$ based on $N_{ID}^{Ncell}$, the set of POs with NRS(s) may meet the condition of Equation 6.

$$\left(PO - PO \% nB - \left(PO \% nB + N_{ID}^{Ncell}\right) \times nB \times \max\left\{1, \frac{R}{nB}\right\}\right) \% RnB = 0 \qquad \text{Equation 6}$$

In yet another configuration, the base station 402 may calculate 424 an offset $O_i$ and may signal one or more parameters to the UEs 404a, 404b, 404c, 404d that allow the UEs 404a, 404b, 404c, 404d to determine the offset $O_i$. For example, the base station 402 may signal one of {dense, uniform}. If the base station 402 signals "dense," then the UEs 404a, 404b, 404c, 404d may use calculate the offset $O_i$ based on Equation 1. If the base station 402 signals "uniform," then the UEs 404a, 404b, 404c, 404d may use calculate the offset $O_i$ based on Equation 4.

While the base station 402 may attempt to schedule the NRS(s) 430a, 430b, 430c, 430d with relatively uniform transmission (e.g., from the perspective of the base station 402), some NRS(s) may overlap or may occur relatively close to one another. Thus, the base station 402 may first group consecutive POs and then apply any of the previous equations to a group of POs (instead of to individual POs). For example, the offset $O_i$ may be based on the grouping of POs (e.g. offset $O_i$ refers to the $i^{th}$ group of POs). For example, the NRS scheduling for a scheduling value being an offset $O_i$ based on $N_{ID}^{Ncell}$, the set of POs with NRS(s) may meet the condition of Equation 7.

$$\left(\left(\left\lfloor \frac{PO}{W} \right\rfloor - \left(\left\lfloor \frac{PO}{W} \right\rfloor\right)\right) \% nB - O_i \times \left\lfloor \frac{N}{W} \right\rfloor\right) \% \left\lfloor \frac{RnB}{W} \right\rfloor = 0 \qquad \text{Equation 7}$$

In Equation 7, the value W may be the number of POs in a PO group. The length of a PO W may be defined by a 3GPP standard (e.g., associated with NB-IoT), signaled by the base station 402 to the UEs 404a, 404b, 404c, 404d and/or may depend on other parameters (e.g., paging and/or DRX parameters).

In another configuration, inter-cell randomization may be prioritized over the uniformity of NRS(s) transmission. In such a configuration, the base station 402 may calculate 424 the scheduling value based on a radio frame number and a subframe number. For example, the base station 402 may generate a pseudorandom sequence initialized by $c_{init} = n_f \times 2^{13} + n_s \div 2 + N_{ID}^{Ncell}$, where $n_f$ is a radio frame number between 0 and 1023 for a PO and $n_s$ is a subframe number within the radio frame between 0 and 20 for the PO. The base station 402 may signal the inverse of a fraction of POs that have NRS(s) as $R + 2^k$. A PO may include NRS(s) if the first k bits of the generated sequence are equal to 1. Accordingly, at least one of the UEs 404a, 404b, 404c, 404d may receive the inverse of a fraction of POs that have NRS(s) $R + 2^k$ and calculate the respective one of the POs 432a, 342b, 432c, 432d having the NRS(s) 430a, 430b, 430c, 430d.

In still another configuration, the base station 402 may schedule NRS(s) transmission so that UEs capable of detecting NRS(s) are scheduled to receive the NRS(s) transmission. For example, when the base station 402 determines 422 the UE groups 406a, 406b, 406c, 406d, the base station 402 may group those UEs having the capability to detect NRS(s) in at least one UE group and only transmit NRS(s) in POs for that at least one UE group. In one aspect, the base station 402 may receive UE capability information from an MME (e.g., the MME 162), and the base station 402 may determine which UEs are capable of detecting NRS(s) based on the received UE capability information. UEs that are not configured to detect NRS(s) may be referred to a "legacy" UEs. In one implementation of the above configuration, the base station 402 may determine the paging occasion for a UE based at least on whether the UE has the capability to detect NRS(s) in a non-anchor carrier. Similarly, a UE may calculate its own paging occasions based at least on whether it has reported the capability to detect NRS(s) in a non-anchor carrier.

For example, if the base station 402 determines 422 that the UE groups include 16 groups (i.e., nB is equal to 16), then the base station 402 may configure NRS-capable UEs into a subset of those 16 groups (e.g., 4 groups). Accordingly, the base station 402 may transmit NRS(s) in POs for the subset of those 16 groups, but may refrain from NRS(s) transmission to the other 12 groups including legacy UEs. Within the NRS-capable UE groups, the base station 402 may still apply a scheduling value to offset the UE groups of the subset from one another. Alternatively, UEs of the NRS-capable UE groups may assume a rate value R equal to 1.

In one aspect in which NRS-capable UEs are grouped together, the base station 402 may schedule POs so that a PO including NRS(s) is shared between legacy UEs and NRS-capable UEs. The base station 402 may signal a "scaling factor" of the fraction of POs that can be used by NRS-capable UEs, and the base station 402 may scale nB by that amount. For example, if the base station 402 signals $$nB = \frac{T}{64}$$

(i.e., so that there are $$\frac{T}{64}$$

UE groups), the base station 402 may also signal information indicating a fractional NRS equal to 32, which means that the NRS-capable UEs may assume that nB' is equal to $$\frac{T}{64} \times 32 = \frac{T}{2}$$

(i.e., there are only $$\frac{T}{2}$$

groups for NRS-capable UEs). In some aspects, the base station 402 may signal the number of NRS-capable UE groups nB' to at least the NRS-capable UEs (e.g., using implicit or explicit signaling). In some aspects, the base station 402 may allocate a subset of carriers for POs to POs that include NRS(s).

In one aspect in which NRS-capable UEs are grouped together, the base station 402 may allocate specific POs and/or carrier to NRS-capable UEs. For example, in the time domain, the base station 402 may add an alternative nB' value. Thus, if the legacy nB value is $$\frac{T}{4}$$

(i.e., there is one PO every 4 radio frames), then for NRS-capable UEs, the base station 402 may signal an nB' value of $$\frac{T}{128}$$

(i.e., there is one PO every 128 radio frames) and introduce an offset of 2 radio frames between an legacy PO and an NRS-capable PO.

In a further configuration, the base station 402 may change the POs that include NRS(s). For example, the base station 402 may change the rate value R, for example, after a threshold period of time. The base station 402 may then include NRS(s) in POs based on the changed rate value R. For example, a first period of time may include 256 radio frames, and the base station 402 may use a rate value R of 2. During the first period, the base station 402 may use the rate value R of 2. After a threshold period of time, the base station 402 may change the rate value R to 1, and may use the rate value R of 1 to schedule NRS(s) in POs. The base station 402 may signal a threshold time period and/or changed rate value R to the UEs 404a, 404b, 404c, 404d and/or threshold time period and/or changed rate value R may be predetermined (e.g., defined in a 3GPP standard). FIG. 12, infra, may illustrate an aspect of changing the rate value R.

In other configurations, the base station 402 may introduce "shifts" to that offsets $O_i$ may vary with time. For extended DRX (eDRX), the base station 402 may apply one of the preceding Equations 1-7 within a paging time window (PTW). Within a subframe, the subframes with NRS(s) may depend on whether the anchor carrier has NRS(s) in that subframe—e.g., if a narrowband PBCH (NPBCH) is transmission in the anchor carrier in a given subframe (with NRS(s)), NRS(s) may not be transmitted in the same subframe in the non-anchor carrier.

Referring to FIG. 5, a block diagram illustrates various configurations 500, 520, 540, 560 of POs for UE groups, in accordance with various aspects of the present disclosure. In the illustrated configurations 500, 520, 540, 560, a group $G_i$ may be a UE group 406a, 406b, 406c, 406d. Therefore, nB may be equal to 4, and the UE ID % nB may be equal to i.

Referring to the PO configuration 500, the base station 402 may determine 422 four UE groups 406a, 406b, 406c, 406d having four different POs 504a, 504b, 504c, 504d. The UE groups 406a, 406b, 406c, 406d may each have a respective set of POs, which may periodically occur.

In one configuration 520, the base station 402 may schedule at least one NRS(s) 510 in every R PO from the perspective of the UE groups 406a, 406b, 406c, 406d. For example, at least one NRS(s) 510 may be included in every other PO for each of the POs 504a, 504b, 504c, 504d for the UE groups 406a, 406b, 406c, 406d. However, in such an aspect, a UE 404d of the fourth UE group 406d may need to wake up T ms before the PO 504d (e.g., during the previous PO 504c) in order to detect the at least one NRS(s) 510 and perform SNR measurements.

In an alternative configuration 540, the base station 402 may schedule the at least one NRS(s) 510 in every R PO from the perspective of the base station 402. For example, at least one NRS(s) 510 may be included in every other PO, regardless of the UE groups 406a, 406b, 406c, 406d. However, in such an aspect, UEs 404b, 404d of the second and fourth UE groups 406b, 406d may not have the at least one NRS 510 scheduled during their own POs 504b, 504d.

In the third configuration 560, the base station 402 may schedule the at least one NRS(s) 510 in the POs 504a, 504b, 504c, 504d such that all UEs 404a, 404b, 404c, 404d of the UE groups 406a, 406b, 406c, 406c are able to detect at least one NRS(s) 510 in the same percentage of the POs 504a, 504b, 504c, 504d. In addition, all UEs 404a, 404b, 404c, 404d of the UE groups 406a, 406b, 406c, 406c are able to uniformly detect at least one NRS(s) 510 and have at least one NRS(s) 510 occurring relatively near to their respective POs 504a, 504b, 504c, 504d in order to perform SNR measurements.

Referring to FIG. 6, a block diagram illustrates various configurations 600, 620, 640 of POs for UE groups, in accordance with various aspects of the present disclosure. In the configurations 600, 620, 640, the offset $O_i$ may be equal to 0, and the scheduling of the at least one NRS(s) 610 may be according to Equation 2, supra.

In the first configuration 600, the base station 402 may determine 422 four UE groups (e.g., the UE groups 406a, 406b, 406c, 406d) (i.e., nB equals 4) and may determine the rate value R is 2. Thus, because the rate value R is two, the at least one NRS(s) may occur in every other PO of the POs 604a, 604b, 604c, 604d from the perspective of the UEs (e.g., the UEs 404a, 404b, 404c, 404d). In order to adhere to Equation 2, the base station 402 may transmit at least one NRS(s) in $PO_0$ for the UE group 0 POs 604a, $PO_1$ for the UE group 1 POs 604a, $PO_2$ for the UE group 3 POs 604c, and $PO_3$ for the UE group 4 POs 604d. The base station 402 may refrain from transmitting at least one NRS(s) 610 in POs 604a, 604b until $PO_8$ through $PO_{11}$, in order to satisfy Equation 2. From the perspective of the base station 402, the at least one NRS(s) 610 may be included in the first nB (i.e., four) POs, excluded from the second nB (i.e., four) POs, included in the third nB (i.e., four) POs, and so forth.

In the second configuration 620, the base station 402 may determine 422 two UE groups (e.g., the UE groups 406a, 406b) (i.e., nB equals 4) and may determine the rate value R is 4. In order to adhere to Equation 2, the base station 402 may transmit at least one NRS(s) in $PO_0$ for the first UE group POs 604a and $PO_1$ for the first UE group POs 604a. The base station 402 may refrain from transmitting at least one NRS(s) 610 in $PO_2$ through $PO_7$ of the POs 604a, 604b until $PO_8$ and $PO_9$. Again, the base station 402 may refrain from transmitting at least one NRS(s) 610 in $PO_{10}$ through $PO_{15}$ of the POs 604a, 604b until $PO_{16}$ and $PO_{17}$, and so forth.

In the third configuration 640, the base station 402 may determine 422 eight UE groups (e.g., including the UE groups 406a, 406b, 406c, 406d) (i.e., nB equals 8) and may determine the rate value R is 2. In order to adhere to Equation 2, the base station 402 may transmit at least one NRS(s) in $PO_0$ through $PO_7$. The base station 402 may refrain from transmitting at least one NRS(s) 610 in $PO_8$ through $PO_{15}$ of the POs 604a, 604b, 604c, 604d, 604e, 604f, 604g, 604h until $PO_{16}$ through $PO_{23}$.

Referring to FIGS. 7A-7B, a block diagram illustrates various configurations 700, 720, 740, 760 of POs for UE groups, in accordance with various aspects of the present disclosure. In the configurations 700, 720, 740, 760 the offset $O_i$ may be equal to i∀i, and the scheduling of the at least one NRS(s) 710 may be according to Equation 3, supra.

In the first configuration 700, the base station 402 may determine 422 four UE groups (e.g., the UE groups 406a, 406b, 406c, 406d) (i.e., nB equals 4) and may determine the rate value R is 2. In order to adhere to Equation 3, the base station 402 may transmit at least one NRS(s) in $PO_0$ for the UE group 0 POs 704a and $PO_2$ for the UE group 3 POs 704c, but may refrain from transmitting at least one NRS(s) 710 in $PO_1$ for the UE group 1 POs 704a and $PO_3$ for the UE group 4 POs 704d. After $PO_3$, the base station 402 may refrain from transmitting at least one NRS(s) 710 in the $PO_4$ for the next of the UE group 0 POs 704a and the $PO_6$ for the next of the UE group 2 POs 704c, but may transmit at least one NRS(s) 710 in the $PO_5$ for the next of the UE group 1 POs 704b and the $PO_7$ for the next of the UE group 4 POs 704d. The pattern may then repeat, as the base station 402 may transmit at least one NRS(s) 710 in the $PO_8$ for the next of the UE group 0 POs 704a and the $PO_{10}$ for the next of the UE group 2 POs 704c, but may refrain from transmitting at least one NRS(s) in the $PO_9$ for the next of the UE group 1 POs 704b and the $PO_{11}$ for the next of the UE group 4 POs 704d.

In the second configuration 720, the base station 402 may determine 422 two UE groups (e.g., the UE groups 406a, 406b) (i.e., nB equals 2) and may determine the rate value R is 4. In order to adhere to Equation 3, the base station 402 may transmit at least one NRS(s) in $PO_0$ for the UE group 0 POs 704a and $PO_3$ for the UE group 1 POs 704b, but may refrain from transmitting at least one NRS(s) 710 in $PO_1$ for the UE group 1 POs 704b and $PO_2$ for the UE group 0 POs 704a. The base station 402 may then refrain from transmitting at least one NRS(s) 710 in $PO_4$ through $PO_7$, and then repeat the pattern by transmitting at least one NRS(s) in $PO_8$ for the next of the UE group 0 POs 704a and $PO_{11}$ for the next of the UE group 1 POs 704b.

In the third configuration 740, the base station 402 may determine 422 eight UE groups (e.g., including the UE groups 406a, 406b, 406c, 406d) (i.e., nB equals 8) and may determine the rate value R is 2. In order to adhere to Equation 3, the base station 402 may transmit at least one NRS(s) in $PO_0$ for the UE group 0 POs 704a, $PO_2$ for the UE group 2 POs 704c, $PO_4$ for the UE group 4 POs 704e, and $PO_6$ for the UE group 6 POs 704g, but may refrain from transmitting at least one NRS(s) 710 in $PO_i$ for the UE group 1 POs 704b, $PO_3$ for the UE group 3 POs 704d, $PO_5$ for the UE group 5 POs 704f, and $PO_7$ for the UE group 7 POs 704h. After the first set of POs 704a, 704b, 704c, 704d, 704e, 704f, 704g, 704h, the base station 402 may refrain from transmitting at least one NRS(s) in $PO_8$ for the next of the UE group 0 POs 704a, $PO_{10}$ for the next of the UE group 2 POs 704c, $PO_{12}$ for the next of the UE group 4 POs 704e, and $PO_{14}$ for the UE group 6 POs 704g, but may transmit at least one NRS(s) 710 in $PO_9$ for the next of the UE group 1 POs 704b, $PO_{11}$ for the UE group 3 POs 704d, $PO_{13}$ for the UE group 5 POs 704f, and $PO_{15}$ for the UE group 7 POs 704h. The base station 402 may then repeat the pattern of $PO_0$ through $PO_{15}$ beginning with $PO_{16}$.

In the fourth configuration 760, the base station 402 may determine 422 two UE groups (e.g., the UE groups 406a, 406b) (i.e., nB equals 2) and may determine the rate value R is 8. In order to adhere to Equation 3, the base station 402 may transmit at least one NRS(s) in $PO_0$ for the UE group 0 POs 704a and $PO_3$ for the UE group 1 POs 704b, but may refrain from transmitting at least one NRS(s) 710 in $PO_1$ for the UE group 1 POs 704b and $PO_2$ for the UE group 0 POs 704a. The base station 402 may then refrain from transmitting at least one NRS(s) 710 in $PO_4$ through $PO_{15}$, and then repeat the pattern by transmitting at least one NRS(s) in $PO_{16}$ for the next of the UE group 0 POs 704a and $PO_{19}$ for the next of the UE group 1 POs 704b.

While using Equation 3 for NRS(s) transmission, resulting in the example configurations 700, 720, 740, 760, may provide some fairness and uniformity, the spacing in time from the perspective of the base station 402 may lose uniformity when the rate value R is greater than nB. The configurations of FIG. 8 may provide more uniform spacing in time from the perspective of the base station 402 when the rate value R is greater than nB.

Figure 8:
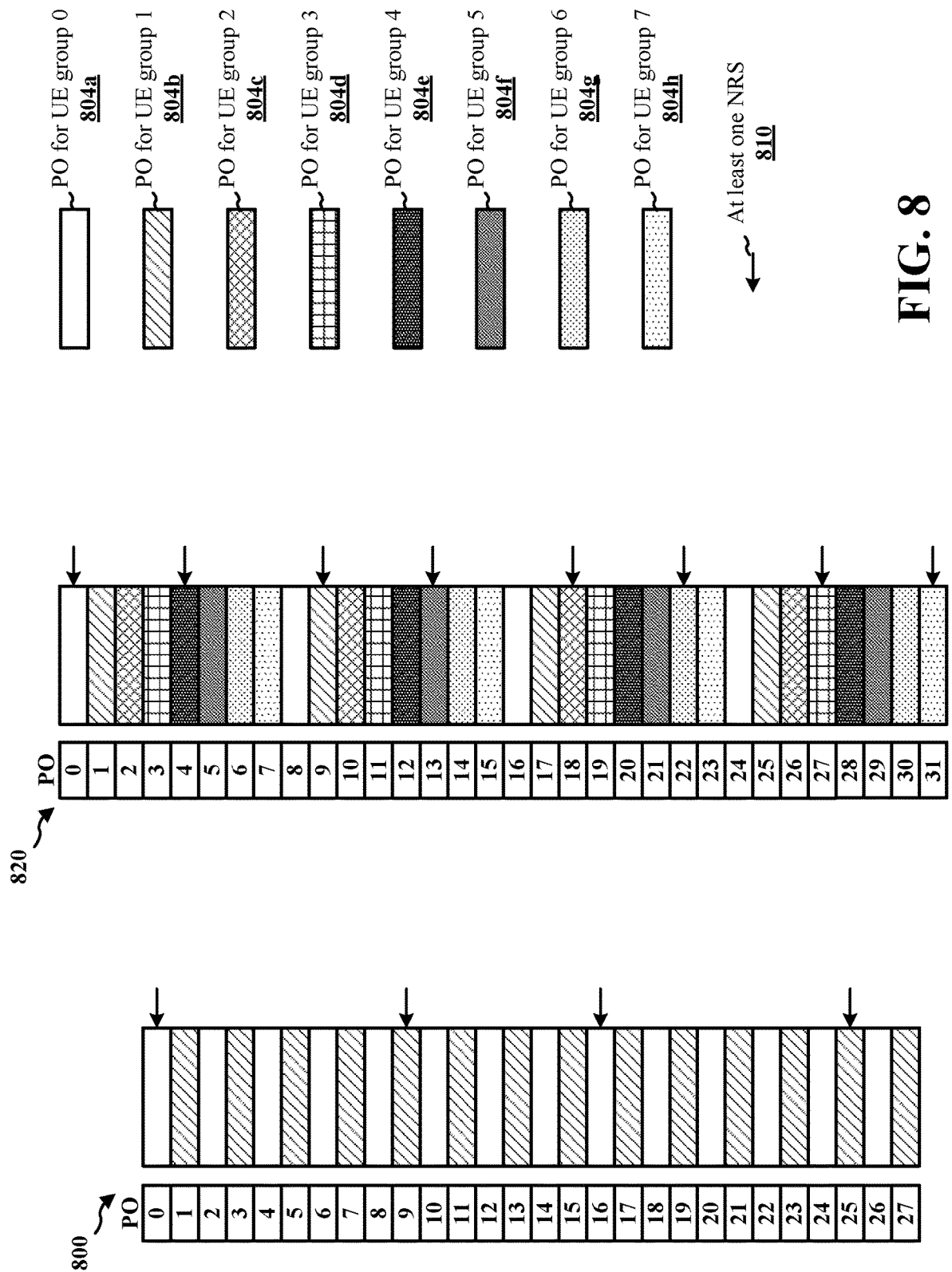
FIG. 8 is a block diagram of narrowband reference signals in paging occasions, in accordance with various aspects of the present disclosure.

Turning to FIG. 8, a block diagram illustrates various configurations 800, 820, of POs for UE groups, in accordance with various aspects of the present disclosure. In the configurations 800, 820, the offset $O_i$ may be equal to $$\max\left\{1, \frac{R}{nB}\right\},$$

and the scheduling of the at least one NRS(s) 810 may be according to Equation 4, supra.

In a first configuration 800, the base station 402 may determine 422 two UE groups (e.g., the UE groups 406a, 406b) (i.e., nB equals 2) and may determine the rate value R is 8. In order to adhere to Equation 4, the base station 402 may transmit at least one NRS(s) in $PO_0$ for the UE group 0 POs 804a and $PO_9$ for the UE group 1 POs 804b, but may refrain from transmitting at least one NRS(s) 810 in $PO_1$ through $PO_8$ for the next 8 consecutive UE group 0 POs 804a and UE group 1 POs 804b. The base station 402 may then refrain from transmitting at least one NRS(s) 810 in $PO_{10}$ through $PO_{15}$ for the next 6 consecutive UE group 0 POs 804a and UE group 1 POs 804b through $PO_{15}$, and then repeat the pattern by transmitting at least one NRS(s) in $PO_{16}$ for the next of the UE group 0 POs 804a and $PO_{25}$ for the next of the UE group 1 POs 804b, but refraining from transmitting at least one NRS(s) 810 in the consecutive POs 804a, 804b from $PO_{17}$ through $PO_{24}$.

In a second configuration 820, the base station 402 may determine 422 eight UE groups (e.g., including the UE groups 406a, 406b, 406c, 406d) (i.e., nB equals 8) and may determine the rate value R is 4. In order to adhere to Equation 4, the base station 402 may transmit at least one NRS(s) 810 in $PO_0$ for the UE group 0 POs 804a and $PO_4$ for the UE group 4 POs 804e, but may refrain from transmitting at least one NRS(s) 810 in $PO_1$ through $PO_3$ for the POs 804b, 804c, 804d of UE groups 1-3 and $PO_5$ through $PO_7$ for the POs 804f, 804g, 804h of UE groups 5-7. After the first set of POs 804a, 804b, 804c, 804d, 804e, 804f, 804g, 804h, the base station 402 may transmit at least one NRS(s) 810 in $PO_9$ for the UE group 1 POs 804b and $PO_{13}$ for the UE group 5 POs 804f, but may refrain from transmitting at least one NRS(s) 810 in $PO_8$, $PO_{10}$, $PO_{11}$, $PO_{12}$, $PO_{14}$, $PO_{15}$ for the POs 804a, 804c, 804d, 804e, 804g, 804h of UE groups 0, 2, 3, 4, 6, and 7. After the next consecutive set of POs 804a, 804b, 804c, 804d, 804e, 804f, 804g, 804h, the base station 402 may transmit at least one NRS(s) 810 in $PO_{18}$ for the UE group 2 POs 804c and $PO_{22}$ for the UE group 6 POs 804g, but may refrain from transmitting at least one NRS(s) 810 in $PO_{16}$, $PO_{17}$, $PO_{19}$, $PO_{20}$, $PO_{21}$, $PO_{23}$ for the POs 804a, 804b, 804d, 804e, 804f, 804h of UE groups 0, 1, 3, 4, 5, and 7. After the next consecutive set of POs 804a, 804b, 804c, 804d, 804e, 804f, 804g, 804h, the base station 402 may transmit at least one NRS(s) 810 in $PO_{27}$ for the UE group 4 POs 804e and $PO_{31}$ for the UE group 7 POs 804h, but may refrain from transmitting at least one NRS(s) 810 in $PO_{24}$, $PO_{25}$, $PO_{26}$, $PO_{28}$, $PO_{29}$, $PO_{30}$ for the POs 804a, 804b, 804c, 804e, 804f, 804g of UE groups 0, 1, 2, 4, 5, and 6. The base station 402 may then repeat this pattern for the next sets of POs 804a, 804b, 804c, 804e, 804f, 804g.

While using Equation 4 for NRS(s) transmission, resulting in the example configurations 800, 820, may provide some fairness and uniformity over Equation 3, the offset $O_i$ may be {0, 1, 2, 3, 4, 5, 6, 7} and therefore cause NRS(s) transmission in POs 804a, 804h of UE groups 0 and 7 to be consecutive. The configurations of FIG. 9 may provide any two consecutive offsets to have an increased (e.g., maximum possible) distance in time.

With respect to FIG. 9, a block diagram illustrates various configurations 900, 920, of POs for UE groups, in accordance with various aspects of the present disclosure. In the configurations 900, 920, the offset $O_i$ may be equal to $$(nB - 1 - i) \times \max\left\{1, \frac{R}{nB}\right\},$$

and the scheduling of the at least one NRS(s) 810 may be according to Equation 5, supra.

In a first configuration 900, the base station 402 may determine 422 four UE groups (e.g., the UE groups 406a, 406b, 406c, 406d) (i.e., nB equals 4) and may determine the rate value R is 4. In order to adhere to Equation 5, the base station 402 may transmit at least one NRS(s) in $PO_3$ for the UE group 3 POs 904d, and may refrain from transmitting at least one NRS(s) 910 in $PO_0$ through $PO_2$ for UE groups 0-2 904a, 904b, 904c. Next, the base station 402 may transmit at least one NRS(s) in $PO_6$ for the UE group 2 POs 904c, and may refrain from transmitting at least one NRS(s) 910 in $PO_4$, $PO_5$, $PO_7$ for UE groups 0, 1, and 3 904a, 904b, 904d. Next, the base station 402 may transmit at least one NRS(s) in $PO_9$ for the UE group 1 POs 904b, and may refrain from transmitting at least one NRS(s) 910 in $PO_8$, $PO_{10}$, $PO_{11}$ for UE groups 0, 2, and 3 904a, 904c, 904d. Finally, the base station 402 may transmit at least one NRS(s) in $PO_{12}$ for the UE group 0 POs 904a, and may refrain from transmitting at least one NRS(s) 910 in $PO_{13}$ through $PO_{15}$ for UE groups 1, 2, and 3 904b, 904c, 904d. The base station 402 may then repeat the pattern for the POs 904a, 904b, 904c, 904d of the UE groups 0-4.

In a second configuration 920, the base station 402 may determine 422 eight UE groups (e.g., including the UE groups 406a, 406b, 406c, 406d) (i.e., nB equals 8) and may determine the rate value R is 4. In order to adhere to Equation 5, the base station 402 may transmit at least one NRS(s) 910 in $PO_3$ for the UE group 3 POs 904d and $PO_7$ for the UE group 7 POs 904e, but may refrain from transmitting at least one NRS(s) 810 in $PO_0$ through $PO_2$ for the POs 904a, 904b, 904c of UE groups 0-2 and $PO_4$ through $PO_6$ for the POs 904e, 904f, 904g of UE groups 4-6. After the first set of POs 904a, 904b, 904c, 904d, 904e, 904f, 904g, 904h, the base station 402 may transmit at least one NRS(s) 910 in $PO_{10}$ for the UE group 2 POs 904c and $PO_{14}$ for the UE group 6 POs 804g, but may refrain from transmitting at least one NRS(s) 910 in $PO_8$, $PO_9$, $PO_{11}$, $PO_{12}$, $PO_{14}$, $PO_{15}$ for the POs 904a, 904b, 904d, 904e, 904f, 904h of UE groups 0, 1, 3, 4, 5, and 7. After the next consecutive set of POs 904a, 904b, 904c, 904d, 904e, 904f, 904g, 904h, the base station 402 may transmit at least one NRS(s) 910 in $PO_{17}$ for the UE group 1 POs 904b and $PO_{21}$ for the UE group 5 POs 904f, but may refrain from transmitting at least one NRS(s) 810 in $PO_{16}$, $PO_{18}$, $PO_{19}$, $PO_{20}$, $PO_{22}$, $PO_{23}$ for the POs 904a, 904c, 904d, 904e, 904g, 904h of UE groups 0, 2, 3, 4, 6, and 7. After the next consecutive set of POs 904a, 904b, 904c, 904d, 904e, 904f, 904g, 904h, the base station 402 may transmit at least one NRS(s) 910 in $PO_{24}$ for the UE group 0 POs 904a and $PO_{28}$ for the UE group 4 POs 904e, but may refrain from transmitting at least one NRS(s) 810 in $PO_{25}$, $PO_{26}$, $PO_{27}$, $PO_{29}$, $PO_{31}$, $PO_{31}$ for the POs 904b, 904c, 904d, 904f, 904g, 904h of UE groups 0, 1, 2, 4, 5, and 6. The base station 402 may then repeat this pattern for the next sets of POs 904a, 904b, 904c, 904e, 904f, 904g.

With respect to FIGS. 10A-10B, a block diagram illustrates various configurations 1000, 1020, of POs for UE groups, in accordance with various aspects of the present disclosure. In the configurations 1000, 1020, the offset $O_i$ may be equal to $$(nB - 1 - i) \times \max\left\{1, \frac{R}{nB}\right\},$$

and the scheduling of the at least one NRS(s) 810 may be according to Equation 5, supra.

The first configuration 1000 may illustrate various POs 1004a, 1004b, 1004c, 1004d, 1004e, 1004f, 1004g, 1004h for different UE groups. Specifically, the first configuration 1000 may illustrate the POs in which at least one NRS(s) 1010 is included for different numbers of groups nB and different rate values R at different PO indexes 0 through 28. While this may provide some uniformity, the spacing of NRS(s) 1010 may not be as uniform in some situations (e.g., when both nB and R are equal to 4) as in other situations.

In the second configuration 1020, the number of the base station 402 may determine 422 four UE groups (e.g., the UE groups 406a, 406b, 406c, 406d) (i.e., nB equals 4) and may determine the rate value R is 4. The offsets $O_i$ of {3, 2, 0, 1} provide some uniformity, for example, over the first configuration 1000 using Equation 5.

Figure 11A:
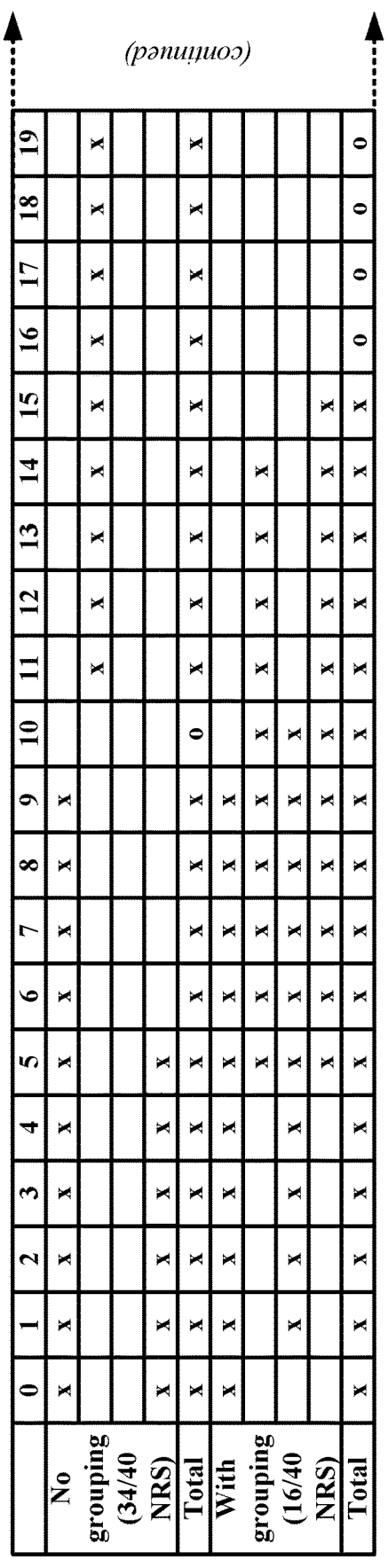

Referring to FIGS. 11A-11B, a block diagram illustrates a configuration 1100 for grouping POs, in accordance with various aspects of the present disclosure. Some configurations may provide nearly uniform transmission of NRS, which may lead to NRSs that are very close to one another in different POs or overlap in time. For example, if Ns is equal to 4 and the rate value R is equal to 4, then there may be a relatively large amount of overhead due to NRSs because several POs may overlap and thus several NRSs may be contemporaneously transmitted.

Therefore, consecutive POs may be grouped, and then NRS(s) may be transmitted in a PO, which may overlap for a plurality of groups. For example, the base station 402 may calculate 424 the scheduling value based on a length of a PO W, as described with respect to Equation 7. Accordingly, NRS(s) may be sent in a time period that overlaps at least partially with POs 1104a, 1104b, 1104c, 1104d for a plurality of UE groups.

Referring to FIG. 12, a block diagram illustrates various configurations 1200, 1220 of POs for UE groups, in accordance with various aspects of the present disclosure. At a first time 1, a first rate value R1 may be used to schedule NRS(s) in POs 1204a, 1204b, 1204c, 1204d. For example, the first rate value R1 may be 2, resulting in the first configuration 1200.

However, the base station 402 may change the rate value from R1 to R2, for example, after a threshold period of time. At time 2 (e.g., after the threshold period of time), the base station 402 may inform UEs of groups 0-3 of the changed rate value R2, which may be 1. The base station 402 may then send NRS(s) 1210 in POs 1204a, 1204b, 1204c, 1204d according to the changed rate value R2, which may result in the second configuration 1220.

Figure 13:
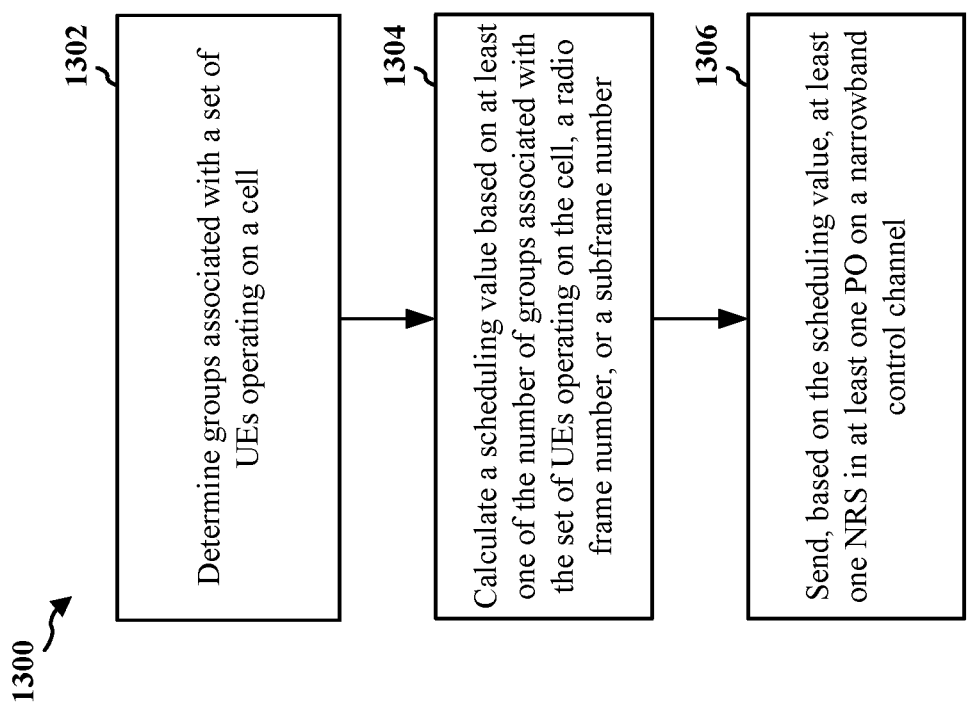
FIG. 13 is a flowchart of a method of wireless communication, in accordance with various aspects of the present disclosure.

FIG. 13 is a flowchart of a method 1300 of wireless communication. The method 1300 may be performed by a base station (e.g., the base station 102/180, 310, 402; the apparatus 1502/1502'; the processing system 1614, which may include the memory 376 and which may be the entire base station 102/180, 310, 402 or a component of the base station 102/180, 310, 402, such as the TX processor 316, the RX processor 370, and/or the controller/processor 375). In various aspects, one or more of the illustrated operations may be transposed, omitted, and/or contemporaneously performed.

At 1302, the base station may determine 422 groups associated with a set of UEs operating on a cell provided by the base station. Accordingly, the base station may determine a number of groups nB associated with the set of UEs operating on the cell. Referring to FIG. 4, the base station 402 may determine the UE groups 406a, 406b, 406c, 406d that include the UEs 404a, 404b, 404c, 404d, respectively.

In one aspect, the base station may receive, from an MME, information indicating a respective capability of each of the set of UEs operating on the cell. The base station may determine a first group of UEs associated with the set of UEs based on the respective capability of each of the set of UEs, and the first group may include a subset of the set of UEs having the respective capability to detect at least one NRS in at least one PO. Further, the base station may determine at least one second group of UEs associated with the set of UEs based on the respective capability of each of the set of UEs, and the second group may include a subset of the set of UEs not having the respective capability to detect at least one NRS in at least one PO.

At 1304, the base station may calculate a scheduling value based on at least one of a number of groups associated with the set of UEs operating on the cell, a radio frame number, or a subframe number. The base station may determine at least one PO that is to include at least one NRS(s) based on the scheduling value. Referring to FIG. 4, the base station 402 may calculate 424 a scheduling value based on at least one of the number of UE groups 406a, 406b, 406c, 406d, a radio frame number, or a subframe number.

In one example, the scheduling value may be an offset $O_i$, which may cause NRS(s) to be included in POs according to one of Equations 1-7. In another example, the scheduling value may include an offset $O_i$ that is based on at least one of an ID associated with the cell or a first offset value that is associated with the cell, and the first offset value may be different from at least a second offset value associated with NRS transmission in a neighboring cell. In another example, the scheduling value may be based on a sequence generated by a pseudorandom sequence, such as $c_{init}=n_f \times 2^{13}+n_s \div 2+N_{ID}^{Ncell}$, where $n_f$ is a radio frame number between 0 and 1023 for a PO and $n_s$ is a subframe number within the radio frame between 0 and 20 for the PO. The base station may determine a PO is to include at least one NRS(s) if the first k bits of the generated sequence are equal to 1.

In one aspect, the base station may calculate the scheduling value based on an index associated with the at least one PO and a rate value R, where the rate value R is associated with a periodicity at which the at least one NRS(s) is sent in the at least one PO. In a further aspect, the base station may calculate the scheduling value further based on a maximum between 1 and the rate value R divided by the number of groups nB.

In another aspect, the base station may determine a number of POs of the at least one PO, and the at least one PO may be associated with a group of POs. The base station may calculate the scheduling value based on a quotient of an index associated with the at least one PO and the number of POs.

In various aspects, the base station may send information in the cell associated with the at least one PO and/or associated with the at least one NRS(s). In some aspects, the information may be included in at least one SIB. For example, the base station may send, in the cell, at least one SIB that includes information indicating the number of groups and/or the rate value R. In another example, the base station may send, in the cell, information indicating a duration between a first PO of the at least one PO having the at least one NRS(s) and a second PO of the at least one PO having the at least one NRS(s). In a further aspect, the base station may send, in the cell, information indicating the calculated scheduling value. In still another aspect, the base station may send, in the cell, information indicating a changed rate value R when the base station changes the rate value R after a threshold period of time.

At 1306, the base station may send, based on the calculated scheduling value, at least one NRS in at least one PO on a narrowband control channel (e.g., an NPDCCH). In various aspects, the at least one PO may not include a paging message when the at least one NRS is included. Referring to FIG. 4, the base station 402 may send the NRS(s) 430a, 430b, 430c, 430d in the POs 432a, 432b, 432c, 432d based on the scheduling value that is calculated 424 by the base station 402. According to various aspects, the base station 402 may send NRS(s) in PO(s) according to one of Equations 1-7, which may be illustrated with respect to FIGS. 5-12. In still another aspect, the base station 402 may send the at least one NRS(s) in PO(s) to a UE group having the capability to detect NRS, but refrain from sending NRS(s) in PO(s) to UE groups not having the capability to detect NRS.

Figure 14:
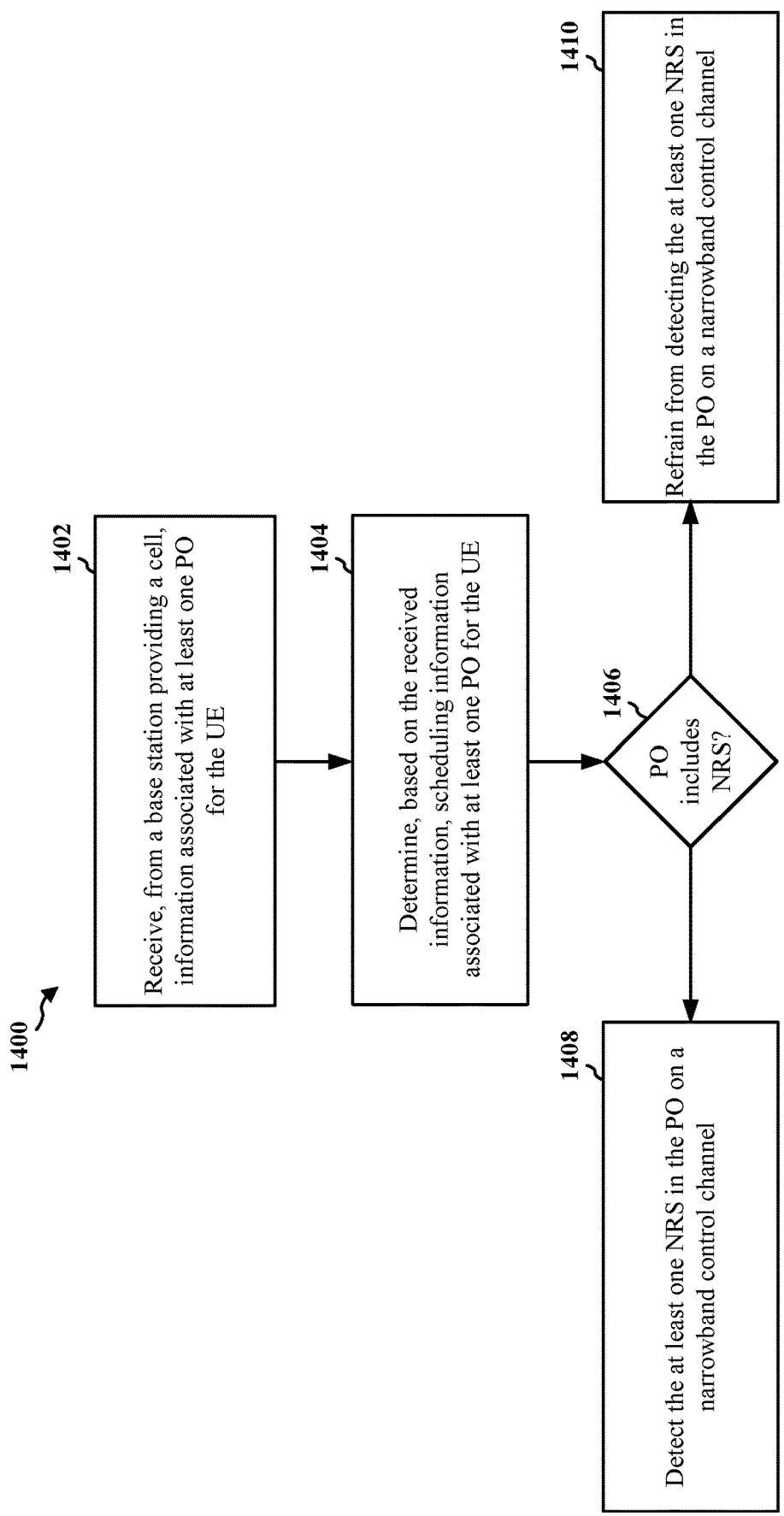
FIG. 14 is a flowchart of a method of wireless communication, in accordance with various aspects of the present disclosure.

FIG. 14 is a flowchart of a method 1400 of wireless communication. The method 1400 may be performed by a UE (e.g., the UE 104, 350, 404a, 404b, 404c, 404d; the apparatus 1702/1702'; the processing system 1814, which may include the memory 360 and which may be the entire UE 104, 350, 404a, 404b, 404c, 404d or a component of the UE 104, 350, 404a, 404b, 404c, 404d, such as the TX processor 368, the RX processor 356, and/or the controller/processor 359). In various aspects, one or more of the illustrated operations may be transposed, omitted, and/or contemporaneously performed.

At 1402, the UE may receive, from a base station providing a cell on which the UE is operating, information associated with at least one PO for the UE. In some aspects, the information may indicate a DRX cycle for the UE, and may indicate when the UE is to wake to detect for paging messages. Referring to FIG. 4, at least one of the UEs 404a, 404b, 404c, 404d may receive the SIB(s) 426, which may indicate information associated with a respective one of the at least one POs 432a, 432b, 432c, 432d.

In some aspects, the UE may send information indicating a capability of the UE to receive NRS transmission. The capability information may be stored at an MME. The UE may receive group information indicating a group associated with the UE based on the capability of the UE to receive NRS transmissions.

At 1404, the UE may determine, based on the received information, scheduling information associated with at least one NRS in the at least one PO. In one aspect, the UE may receive information associated with (or indicating) the scheduling information from the base station (e.g., in a SIB). Referring to FIG. 4, at least one of the UEs 404a, 404b, 404c, 404d may determine 428a, 428b, 428c, 428d, based on the SIB(s) 426, scheduling information associated with a respective one of the at least one NRS(s) 430a, 430b, 430c, 430d in a respective one of the at least one POs 432a, 432b, 432c, 432d.

For example, the UE may calculate a scheduling value associated with the at least one PO based on at least one of a number of groups nB associated with a set of UEs operating on the cell, a radio frame number, or a subframe number. The UE may determine the scheduling information based on the scheduling value.

In various aspects, the scheduling value may be an offset $O_i$, which may cause NRS(s) to be included in POs according to one of Equations 1-7. In another example, the scheduling value may include an offset $O_i$ that is based on at least one of an ID associated with the cell or a first offset value that is associated with the cell, and the first offset value may be different from at least a second offset value associated with NRS transmission in a neighboring cell. In another example, the scheduling value may be based on a sequence generated by a pseudorandom sequence, such as $c_{init} = n_f \times 2^{13} + n_s \div 2 + N_{ID}^{Ncell}$, where $n_f$ is a radio frame number between 0 and 1023 for a PO and $n_s$ is a subframe number within the radio frame between 0 and 20 for the PO. The UE may determine a PO is to include at least one NRS(s) if the first k bits of the generated sequence are equal to 1.

In one aspect, the UE may calculate the scheduling value based on an index associated with the at least one PO and a rate value R, and the rate value R may be associated with a periodicity at which the at least one NRS is send in the at least one PO. In a further aspect, the UE may calculate the scheduling value further based on a maximum between 1 and the rate value R divided by the number of groups nB. In still another aspect, the UE may calculate the scheduling value based on the quotient of the index associated with the at least one PO and a number of the at least one PO.

At least one of the number of groups nB and/or the rate value R may be signaled to the UE by the base station (e.g., in a SIB). In some aspects, the rate value R may change after a threshold period of time, and the UE may receive information indicating the change to the rate value R from the base station. The UE may determine again (e.g., update) the scheduling information based on the change to the rate value R.

At 1406, the UE may determine whether a PO includes at least one NRS. For example, the UE may use the scheduling information to determine whether the next PO includes at least one NRS. In some aspects, the UE may use the offset $O_i$ to determine whether the next PO includes NRS. In another aspect, the UE may determine a PO is to include at least one NRS(s) if the first k bits of a generated pseudo-random sequence are equal to 1. In another aspect, the UE may determine that a PO is to include at least one NRS(s) when the UE is included in an NRS-capable group or when the PO for the UE is grouped with at least one other PO that includes at least one NRS(s). Referring to FIG. 4, at least one of the UEs 404a, 404b, 404c, 404d may determine whether a respective one of the at least one NRS(s) 430a, 430b, 430c, 430d is included in a respective one of the at least one POs 432a, 432b, 432c, 432d, for example, based on the determination 428a, 428b, 428c, 428d of the scheduling information.

If the UE determines the PO includes at least one NRS(s), the UE may detect the at least one NRS in the at least one PO on a narrowband control channel (e.g., NPDCCH), as shown at 1408. For example, the UE may wake up to an "on" portion of a DRX cycle to detect during a PO. In some aspects, the at least one PO that includes the at least one NRS(s) does not include a paging message intended for the UE. When the UE detects the at least one NRS(s), the UE may perform channel measurements (e.g., SNR estimation) based on the at least one NRS(s). Referring to FIG. 4, at least one of the UEs 404a, 404b, 404c, 404d may detect a respective one of the at least one NRS(s) 430a, 430b, 430c, 430d included in a respective one of the at least one POs 432a, 432b, 432c, 432d if the UE determines the respective one of the at least one POs 432a, 432b, 432c, 432d includes at least one NRS(s).

If the UE determines the PO does not include at least one NRS(s), the UE may refrain from detecting for the at least one NRS in the at least one PO on a narrowband control channel (e.g., NPDCCH), as shown at 1410. For example, the UE may refrain from waking up to an "on" portion of a DRX cycle to detect during a PO. Referring to FIG. 4, at least one of the UEs 404a, 404b, 404c, 404d may refrain from detecting for a respective one of the at least one NRS(s) 430a, 430b, 430c, 430d included in a respective one of the at least one POs 432a, 432b, 432c, 432d if the UE determines the respective one of the at least one POs 432a, 432b, 432c, 432d does not include at least one NRS(s).

Figure 15:
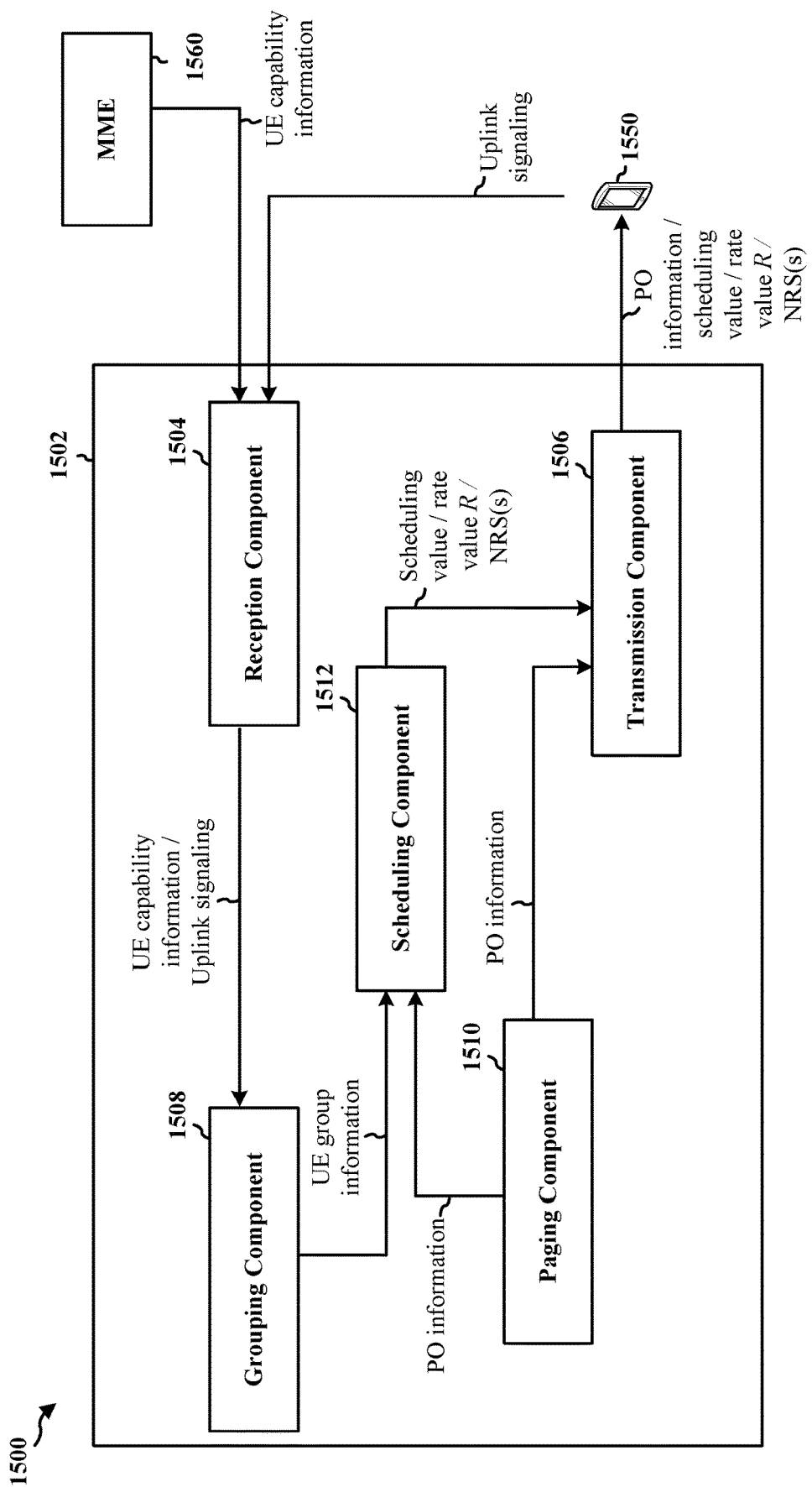
FIG. 15 is a conceptual data flow diagram illustrating an example data flow between different means/components in an example apparatus.

FIG. 15 is a conceptual data flow diagram 1500 illustrating the data flow between different means/components in an example apparatus 1502. The apparatus 1502 may be a base station. The apparatus 1502 may include a reception component 1504 that may be configured to receive UE capability information associated with one or more UEs from an MME 1560, and may be further configured to receive uplink signaling from at least one UE 1550 operating on a cell provided by the apparatus 1502.

The apparatus 1502 may further include a grouping component 1508 configured to determine groups associated with a set of UEs (e.g., including the UE 1550) operating on the cell, for example, as described in connection with operation 1302 of FIG. 13. In one aspect, each of the groups associated with the set of UEs may be scheduled with a respective set of POs. The apparatus 1502 may further include a paging component 1510 configured to determine the respective set of POs for each of the groups associated with the set of UEs.

The apparatus 1502 may further include a scheduling component 1512 configured to calculate a scheduling value based on at least one of a number of groups associated with the set of UEs operating on the cell, a radio frame number, and/or a subframe number, for example, as described in connection with operation 1304 of FIG. 13. In some aspects, the scheduling component 1512 may calculate the scheduling value based on at least one of an index associated with at least one PO (indicated by the paging component 1510) and/or a rate value R, and the rate value R may be associated with a periodicity at which NRSs are transmitted in the at least one PO. In some other aspects, the scheduling value may be calculated further based on a maximum between 1 and the rate value R divided by the number of groups. In some further aspects, the rate value R is based on the number of groups associated with the set of UEs. In yet other aspects, the scheduling value may include an offset that is based on an SFN. In still other aspects, each of the groups associated with the set of UEs may be scheduled with a respective set of POs, and the scheduling value may be calculated to schedule at least one NRS in a same percentage of POs for each set of POs.

The apparatus 1502 may further include a transmission component 1506 that may be configured to send, based on the calculated scheduling value, at least one NRS in at least one PO on a narrowband control channel, for example, as described in connection with operation 1306 of FIG. 13. In one aspect, the at least one NRS is in the at least one PO when paging messages are absent from the at least one PO. In some other aspects, the transmission component 1506 may be further configured to send, in the cell, at least one SIB that indicates the scheduling value.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
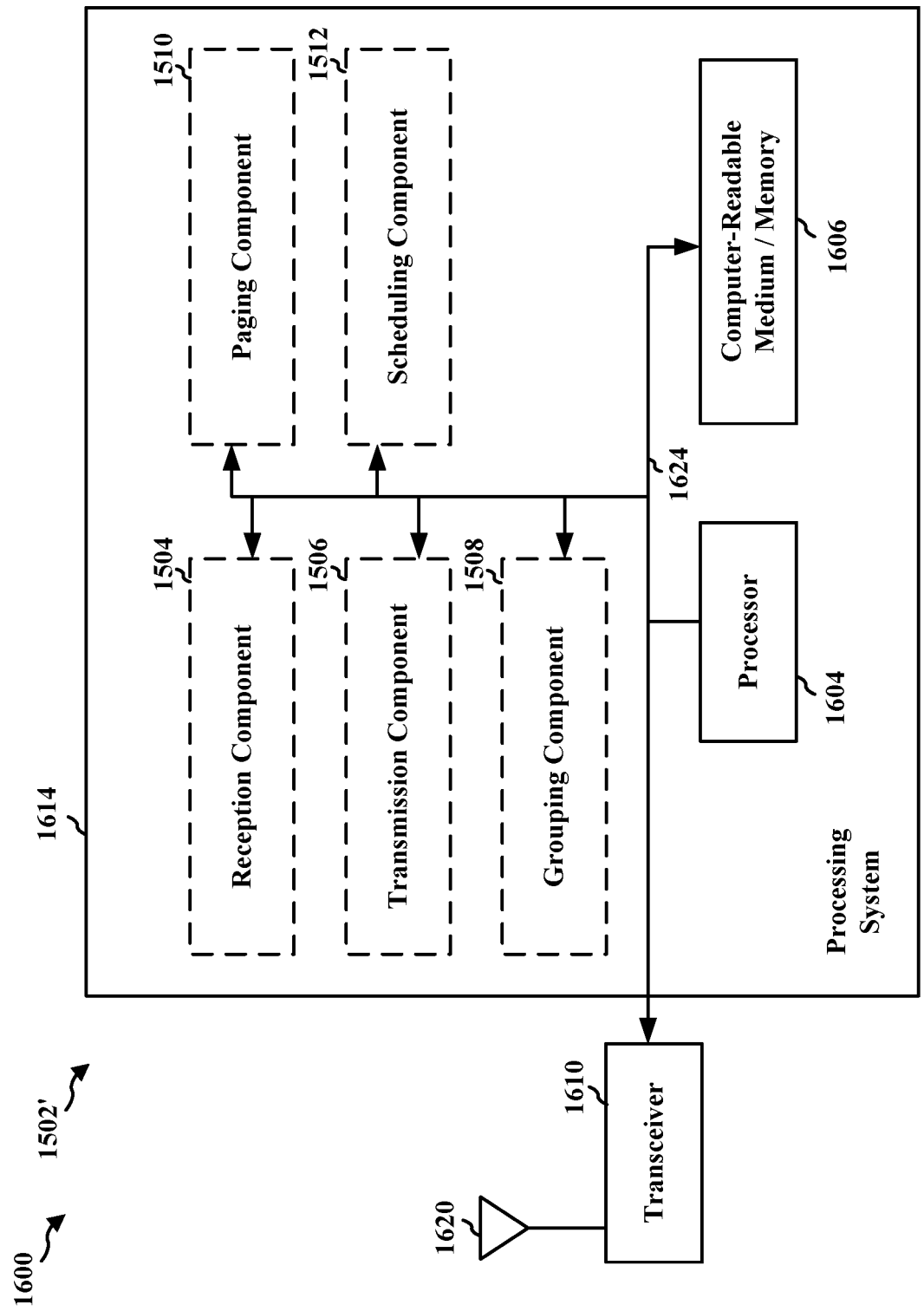
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1506, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512. The components may be software components running in the processor 1604, resident/stored in the computer readable medium/memory 1606, one or more hardware components coupled to the processor 1604, or some combination thereof. The processing system 1614 may be a component of the base station 310 and may include the memory 376 and/or at least one of the TX processor 316, the RX processor 370, and the controller/processor 375. Alternatively, the processing system 1614 may be the entire base station (e.g., see 310 of FIG. 3).

In one configuration, the apparatus 1502/1502' for wireless communication includes means for calculating a scheduling value based on at least one of a number of groups associated with a set of UE operating on the cell, a radio frame number, or a subframe number; and means for sending, based on the calculated scheduling value, at least one NRS in at least one PO on a narrowband control channel. In one aspect, the apparatus 1502/1502' further includes means for determining the number of groups associated with the set of UEs operating on the cell.

In one aspect, the at least one NRS is in the at least one PO when paging messages are absent from the at least one PO. In one aspect, the scheduling value is calculated based on an index associated with the at least one PO and a rate value R, the rate value R being associated with a periodicity at which the at least one NRS is sent in the at least one PO. In one aspect, the scheduling value is calculated further based on a maximum between 1 and the rate value R divided by the number of groups.

In one aspect, the rate value R is based on the number of groups associated with the set of UEs. In one aspect, the scheduling value includes an offset that is based on a SFN. In one aspect, each of the groups associated with the set of UEs is scheduled with a respective set of POs, and the scheduling value is calculated to schedule the at least one NRS in a same percentage of POs for each set of POs. In one aspect, the apparatus 1502/1502' further includes means for sending, in the cell, at least one SIB, and the at least one SIB indicates the scheduling value.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 17:
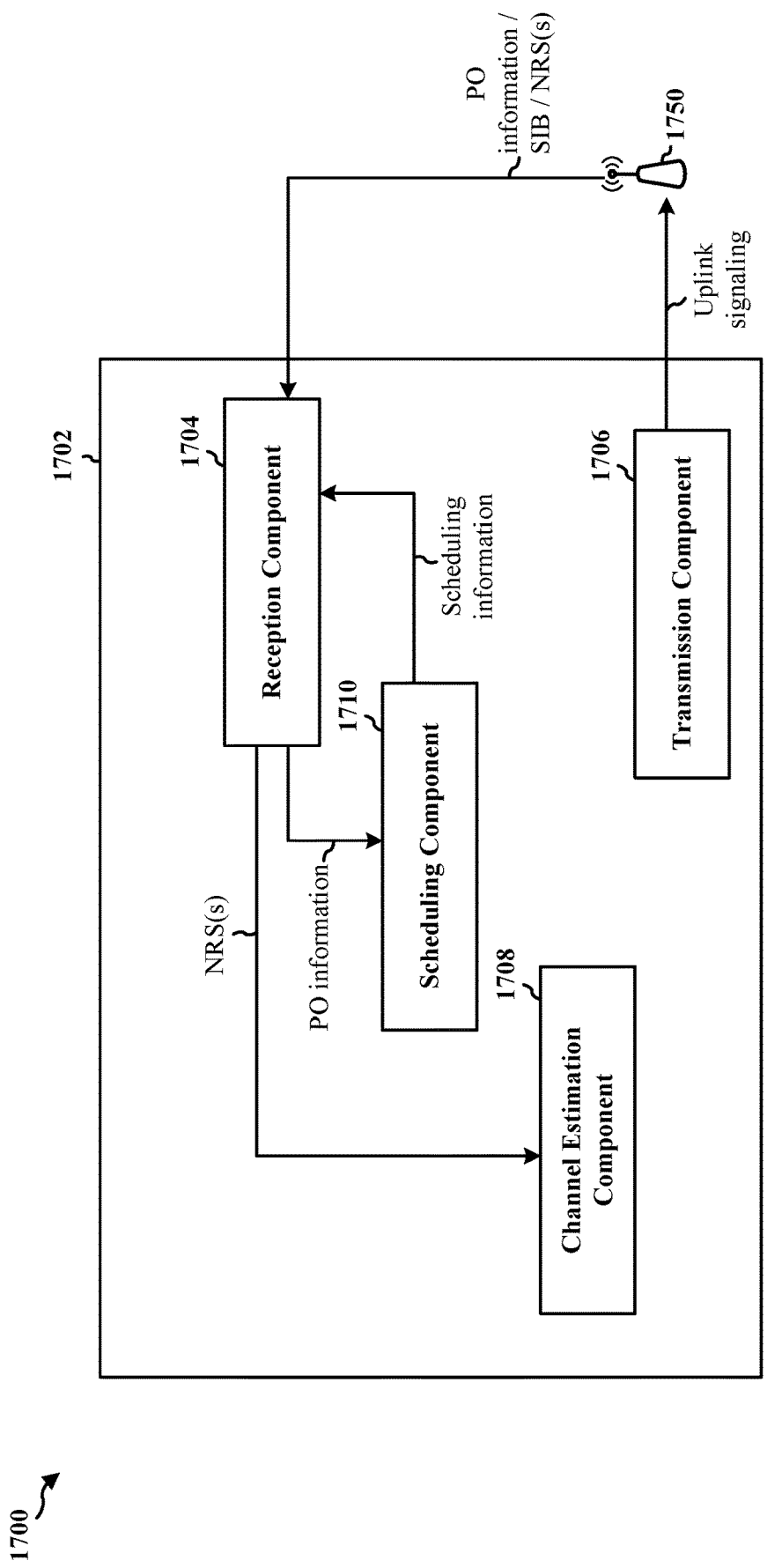
FIG. 17 is a conceptual data flow diagram illustrating another example data flow between different means/components in an example apparatus.

FIG. 17 is a conceptual data flow diagram 1700 illustrating the data flow between different means/components in an example apparatus 1702. The apparatus 1702 may be a UE. The apparatus 1702 includes a reception component 1704 that may be configured to receive, from a base station 1750 providing a cell, information associated with at least one PO for the apparatus 1702, for example, as described in connection with operation 1402 of FIG. 14. In some aspects, the reception component 1704 may be further configured to receive, from the base station, at least one SIB.

The apparatus 1702 may further include a scheduling component 1710 configured to determine, based on the received information, scheduling information associated with at least one NRS in the at least one PO, for example, as described in connection with operation 1404 of FIG. 14. For example, the scheduling value may be determined based on information indicated in the at least one SIB and/or based on the information associated with at least one PO for the apparatus 1702. In some aspects, the scheduling component 1710 may determine a scheduling value associated with the at least one PO based on at least one of a number of groups associated with a set of UEs operating on the cell, a radio frame number, and/or a subframe number, and the scheduling information may be determined based on the scheduling value.

In some other aspects, the scheduling value may be determined based on at least one of an index associated with the at least one PO or a rate value R, the rate value R being associated with a periodicity at which the at least one NRS is sent in the at least one PO. In some further aspects, the scheduling value may be determined further based on a maximum between 1 and the rate value R divided by the number of groups. In still other aspects, the rate value R may be based on the number of groups associated with the set of UEs. In yet further aspects, the scheduling value may include an offset that is based on an SFN.

The scheduling component 1710 may configure the reception component 1704 to detect the at least one NRS in the at least one PO on a narrowband control channel when the determined scheduling information indicates the at least one NRS is in the at least one PO. When the reception component 1704 detects, and receives, the at least one NRS, the reception component 1704 may provide the at least one NRS to a channel estimation component 1708. The channel estimation component 1708 may estimate the channel, for example, in order to receive and successfully decode a paging message intended for the apparatus 1702.

The scheduling component 1710 may further configure the reception component 1704 to refrain from detecting the at least one NRS in the at least one PO on a narrowband control channel when the determined scheduling information indicates the at least one NRS is absent from the at least one PO. A paging message intended for the apparatus 1702 may be absent from the at least one PO when the at least one NRS is in the at least one PO.

The apparatus 1702 may further include a transmission component 1706 configured to transmit uplink signaling to the base station 1750.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
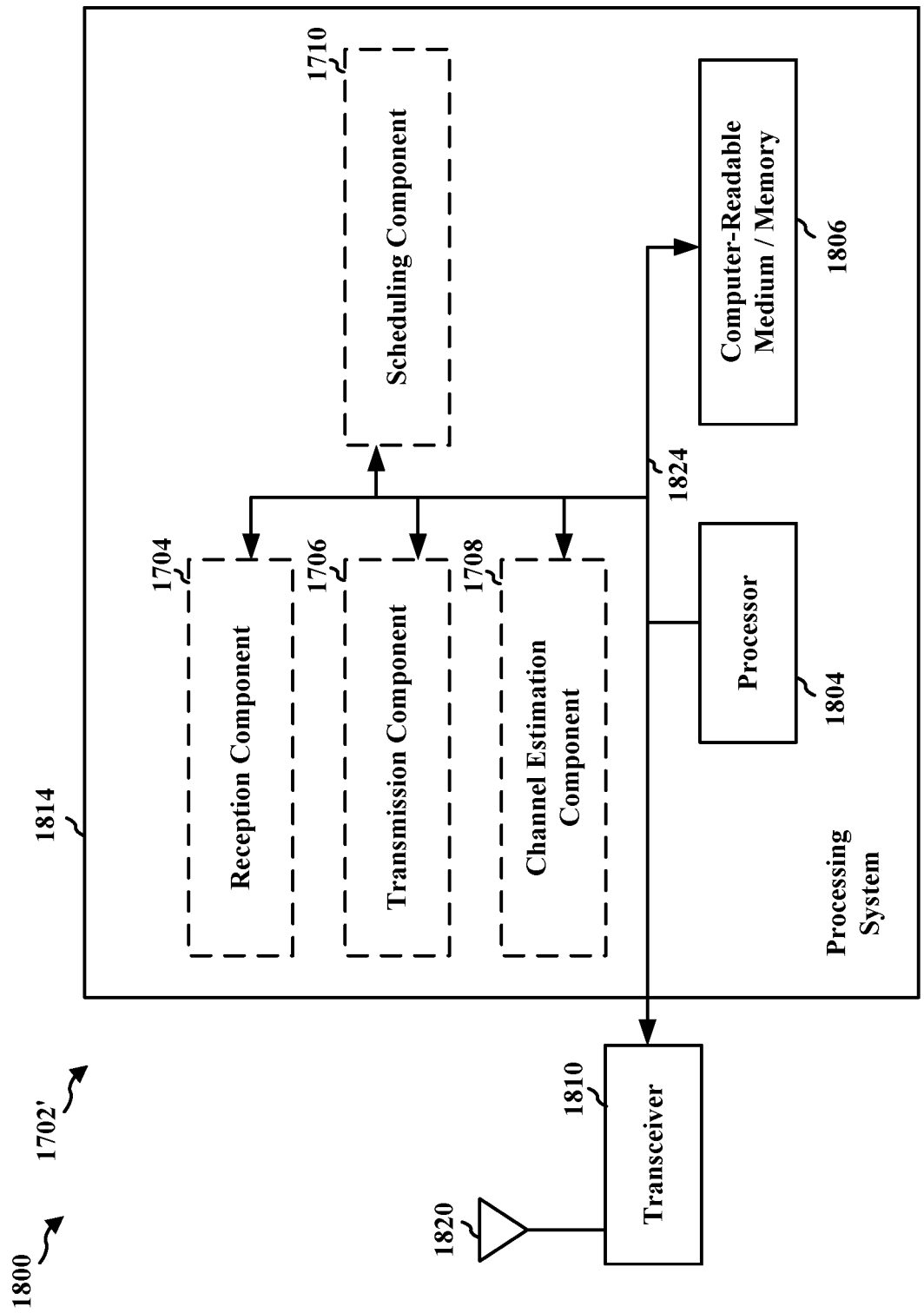
FIG. 18 is a diagram illustrating another example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1706, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710. The components may be software components running in the processor 1804, resident/stored in the computer readable medium/memory 1806, one or more hardware components coupled to the processor 1804, or some combination thereof. The processing system 1814 may be a component of the UE 350 and may include the memory 360 and/or at least one of the TX processor 368, the RX processor 356, and the controller/processor 359. Alternatively, the processing system 1814 may be the entire UE (e.g., see 350 of FIG. 3).

In one configuration, the apparatus 1702/1702' for wireless communication includes means for receiving, from a base station providing the cell, information associated with at least one PO for the UE; means for determining, based on the received information, scheduling information associated with at least one NRS in the at least one PO; means for detecting the at least one NRS in the at least one PO on a narrowband control channel when the determined scheduling information indicates the at least one NRS is in the at least one PO; and means for refraining from detecting for the at least one NRS in the at least one PO on the narrowband control channel when the determined scheduling information indicates the at least one NRS is absent from the at least one PO.

In one aspect, a paging message intended for the UE is absent from the at least one PO when the at least one NRS is in the at least one PO. In one aspect, the apparatus 1702/1702' may further include means for calculating a scheduling value associated with the at least one PO based on at least one of a number of groups associated with a set of UEs operating on the cell, a radio frame number, or a subframe number, and the scheduling information is determined based on the scheduling value. In one aspect, the scheduling value is calculated based on an index associated with the at least one PO and a rate value R, the rate value R being associated with a periodicity at which the at least one NRS is sent in the at least one PO.

In one aspect, the scheduling value is calculated further based on a maximum between 1 and the rate value R divided by the number of groups. In one aspect, the rate value R is based on the number of groups associated with the set of UEs. In one aspect, the scheduling value includes an offset that is based on an SFN. In one aspect, the apparatus 1702/1702' may further include means for receiving, from the base station, at least one SIB, and the scheduling value is determined based on information indicated in the at least one SIB.

The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a base station configured to provide a cell, the method comprising:
   calculating a scheduling value based on at least one of a number of groups associated with a set of user equipments (UEs) operating on the cell, a radio frame number, or a subframe number, wherein the calculation of the scheduling value based on the number of groups associated with the set of UEs operating on the cell is further based on at least one of an index associated with at least one paging occasion (PO) or a rate value R, the rate value R being associated with a periodicity at which at least one narrowband reference signal (NRS) is sent in the at least one PO; and
   sending, based on the calculated scheduling value, the at least one NRS in the at least one PO on a narrowband control channel.

2. The method of claim 1, further comprising:
   determining the number of groups associated with the set of UEs operating on the cell.

3. The method of claim 1, wherein the at least one NRS is in the at least one PO when paging messages are absent from the at least one PO.

4. The method of claim 1, wherein the scheduling value is calculated further based on a maximum between 1 and the rate value R divided by the number of groups.

5. The method of claim 1, wherein the rate value R is based on the number of groups associated with the set of UEs.

6. The method of claim 1, wherein each of the groups associated with the set of UEs is scheduled with a respective set of POs, and wherein the scheduling value is calculated to schedule the at least one NRS in a same percentage of POs for each set of POs.

7. The method of claim 1, further comprising:
   sending, in the cell, at least one system information block (SIB), wherein the at least one SIB indicates the scheduling value.

8. A method of wireless communication by a user equipment (UE) operating on a cell, the method comprising:
   receiving, from a base station providing the cell, information associated with at least one paging occasion (PO) for the UE;
   determining, based on the received information, scheduling information associated with at least one narrowband reference signal (NRS) in the at least one PO, wherein the scheduling information is determined based on a scheduling value associated with the at least one PO, wherein the scheduling value is determined based on at least one of a number of groups associated with a set of UEs operating on the cell, a radio frame number, or a subframe number, wherein the determination of the scheduling value based on the number of groups associated with the set of UEs operating on the cell is further based on at least one of an index associated with at least one paging occasion (PO) or a rate value R, the rate value R being associated with a periodicity at which at least one narrowband reference signal (NRS) is sent in the at least one PO;
detecting the at least one NRS in the at least one PO on a narrowband control channel when the determined scheduling information indicates the at least one NRS is in the at least one PO; and
refraining from detecting for the at least one NRS in the at least one PO on the narrowband control channel when the determined scheduling information indicates the at least one NRS is absent from the at least one PO.

9. The method of claim 8, wherein a paging message intended for the UE is absent from the at least one PO when the at least one NRS is in the at least one PO.

10. The method of claim 8, wherein the scheduling value is determined further based on a maximum between 1 and the rate value R divided by the number of groups.

11. The method of claim 8, wherein the rate value R is based on the number of groups associated with the set of UEs.

12. The method of claim 8, further comprising:
receiving, from the base station, at least one system information block (SIB), wherein the scheduling value is determined based on information indicated in the at least one SIB.

13. An apparatus for wireless communication at a base station configured to provide a cell, the apparatus comprising:
means for calculating a scheduling value based on at least one of a number of groups associated with a set of user equipment (UE) operating on the cell, a radio frame number, or a subframe number, wherein the calculation of the scheduling value based on the number of groups associated with the set of UEs operating on the cell is further based on at least one of an index associated with at least one paging occasion (PO) or a rate value R, the rate value R being associated with a periodicity at which at least one narrowband reference signal (NRS) is sent in the at least one PO; and
means for sending, based on the calculated scheduling value, the at least one NRS in the at least one PO on a narrowband control channel.

14. The apparatus of claim 13, further comprising:
means for determining the number of groups associated with the set of UEs operating on the cell.

15. The apparatus of claim 13, wherein the at least one NRS is in the at least one PO when paging messages are absent from the at least one PO.

16. The apparatus of claim 13, wherein the scheduling value is calculated further based on a maximum between 1 and the rate value R divided by the number of groups.

17. The apparatus of claim 13, wherein the rate value R is based on the number of groups associated with the set of UEs.

18. The apparatus of claim 13, wherein each of the groups associated with the set of UEs is scheduled with a respective set of POs, and wherein the scheduling value is calculated to schedule the at least one NRS in a same percentage of POs for each set of POs.

19. The apparatus of claim 13, further comprising:
means for sending, in the cell, at least one system information block (SIB), wherein the at least one SIB indicates the scheduling value.

20. An apparatus for wireless communication at a user equipment (UE) operating on a cell, the apparatus comprising:
means for receiving, from a base station providing the cell, information associated with at least one paging occasion (PO) for the UE;
means for determining, based on the received information, scheduling information associated with at least one narrowband reference signal (NRS) in the at least one PO, wherein the scheduling information is determined based on a scheduling value associated with the at least one PO, wherein the scheduling value is calculated based on at least one of a number of groups associated with a set of UEs operating on the cell, a radio frame number, or a subframe number, wherein the calculation of the scheduling value based on the number of groups associated with the set of UEs operating on the cell is further based on at least one of an index associated with at least one paging occasion (PO) or a rate value R, the rate value R being associated with a periodicity at which at least one narrowband reference signal (NRS) is sent in the at least one PO;
means for detecting the at least one NRS in the at least one PO on a narrowband control channel when the determined scheduling information indicates the at least one NRS is in the at least one PO; and
means for refraining from detecting for the at least one NRS in the at least one PO on the narrowband control channel when the determined scheduling information indicates the at least one NRS is absent from the at least one PO.

21. The apparatus of claim 20, wherein a paging message intended for the UE is absent from the at least one PO when the at least one NRS is in the at least one PO.

22. The apparatus of claim 20, wherein the scheduling value is calculated further based on a maximum between 1 and the rate value R divided by the number of groups.

23. The apparatus of claim 20, wherein the rate value R is based on the number of groups associated with the set of UEs.

24. The apparatus of claim 20, further comprising:
means for receiving, from the base station, at least one system information block (SIB), wherein the scheduling value is determined based on information indicated in the at least one SIB.

25. An apparatus for wireless communication at a base station configured to provide a cell, the apparatus comprising:
a processor;
a memory coupled with the processor; and
instructions stored in the memory and operable, when executed by the processor, to cause the apparatus to:
calculate a scheduling value based on at least one of a number of groups associated with a set of user equipment (UE) operating on the cell, a radio frame number, or a subframe number, wherein the calculation of the scheduling value based on the number of groups associated with the set of UEs operating on the cell is further based on at least one of an index associated with at least one paging occasion (PO) or a rate value R, the rate value R being associated with a periodicity at which at least one narrowband reference signal (NRS) is sent in the at least one PO; and send, based on the calculated scheduling value, the at least one NRS in the at least one PO on a narrowband control channel.

26. The apparatus of claim 25, wherein the instructions, when executed by the processor, further cause the apparatus to:

determine the number of groups associated with the set of UEs operating on the cell.

27. The apparatus of claim 25, wherein the at least one NRS is in the at least one PO when paging messages are absent from the at least one PO.

28. The apparatus of claim 25, wherein the scheduling value is calculated further based on a maximum between 1 and the rate value R divided by the number of groups.

29. The apparatus of claim 25, wherein the rate value R is based on the number of groups associated with the set of UEs.

30. The apparatus of claim 25, wherein each of the groups associated with the set of UEs is scheduled with a respective set of POs, and wherein the scheduling value is calculated to schedule the at least one NRS in a same percentage of POs for each set of POs.

31. The apparatus of claim 25, wherein the instructions, when executed by the processor, further cause the apparatus to:

send, in the cell, at least one system information block (SIB), wherein the at least one SIB indicates the scheduling value.

32. An apparatus for wireless communication at a user equipment (UE) operating on a cell, the apparatus comprising:

a processor;
a memory coupled with the processor; and
instructions stored in the memory and operable, when executed by the processor, to cause the apparatus to:
  receive, from a base station providing the cell, information associated with at least one paging occasion (PO) for the UE;
  determine, based on the received information, scheduling information associated with at least one narrowband reference signal (NRS) in the at least one PO, wherein the scheduling information is determined based on a scheduling value associated with the at least one PO, wherein the scheduling value is calculated based on at least one of a number of groups associated with a set of UEs operating on the cell, a radio frame number, or a subframe number, wherein the calculation of the scheduling value based on the number of groups associated with the set of UEs operating on the cell is further based on at least one of an index associated with at least one paging occasion (PO) or a rate value R, the rate value R being associated with a periodicity at which at least one narrowband reference signal (NRS) is sent in the at least one PO;
  detect the at least one NRS in the at least one PO on a narrowband control channel when the determined scheduling information indicates the at least one NRS is in the at least one PO; and
  refrain from detecting for the at least one NRS in the at least one PO on the narrowband control channel when the determined scheduling information indicates the at least one NRS is absent from the at least one PO.

33. The apparatus of claim 32, wherein a paging message intended for the UE is absent from the at least one PO when the at least one NRS is in the at least one PO.

34. The apparatus of claim 32, wherein the scheduling value is calculated further based on a maximum between 1 and the rate value R divided by the number of groups.

35. The apparatus of claim 32, wherein the rate value R is based on the number of groups associated with the set of UEs.

36. The apparatus of claim 32, wherein the instructions, when executed by the processor, further cause the apparatus to:

receive, from the base station, at least one system information block (SIB), wherein the scheduling value is determined based on information indicated in the at least one SIB.

37. A computer-readable medium storing computer-executable code for wireless communication by a base station providing a cell, comprising code to:

calculate a scheduling value based on at least one of a number of groups associated with a set of user equipment (UE) operating on the cell, a radio frame number, or a subframe number, wherein the calculation of the scheduling value based on the number of groups associated with the set of UEs operating on the cell is further based on at least one of an index associated with at least one paging occasion (PO) or a rate value R, the rate value R being associated with a periodicity at which at least one narrowband reference signal (NRS) is sent in the at least one PO; and send, based on the calculated scheduling value, the at least one NRS in the at least one PO on a narrowband control channel.

38. A computer-readable medium storing computer-executable code for wireless communication by a user equipment (UE) operating on a cell, comprising code to:

receive, from a base station providing the cell, information associated with at least one paging occasion (PO) for the UE;

determine, based on the received information, scheduling information associated with at least one narrowband reference signal (NRS) in the at least one PO, wherein the scheduling information is determined based on a scheduling value associated with the at least one PO, wherein the scheduling value is calculated based on at least one of a number of groups associated with a set of UEs operating on the cell, a radio frame number, or a subframe number, wherein the calculation of the scheduling value based on the number of groups associated with the set of UEs operating on the cell is further based on at least one of an index associated with at least one paging occasion (PO) or a rate value R, the rate value R being associated with a periodicity at which at least one narrowband reference signal (NRS) is sent in the at least one PO;

detect the at least one NRS in the at least one PO on a narrowband control channel when the determined scheduling information indicates the at least one NRS is in the at least one PO; and refrain from detecting for the at least one NRS in the at least one PO on the narrowband control channel when the determined scheduling information indicates the at least one NRS is absent from the at least one PO.

39. The method of claim 1, wherein the scheduling value is calculated to include an offset based on a system frame number (SFN).

40. The method of claim 8, wherein the scheduling value comprises an offset that is based on a system frame number (SFN).

41. The apparatus of claim 13, wherein the scheduling value is calculated to include an offset based on a system frame number (SFN).

42. The apparatus of claim 20, wherein the scheduling value is calculated to include an offset based on a system frame number (SFN).

43. The apparatus of claim 25, wherein the scheduling value is calculated to include an offset based on a system frame number (SFN).

44. The apparatus of claim 32, wherein the scheduling value is calculated to include an offset based on a system frame number (SFN).

45. The non-transitory computer-readable medium of claim 37, wherein the scheduling value is calculated to include an offset based on a system frame number (SFN).

46. The non-transitory computer-readable medium of claim 38, wherein the scheduling value is calculated to include an offset based on a system frame number (SFN).

* * * * *